US012639397B2

(12) United States Patent
Bajic et al.

(10) Patent No.: US 12,639,397 B2
(45) Date of Patent: May 26, 2026

(54) RUNTIME PREDICTORS FOR COMPUTATION REDUCTION IN DEPENDENT COMPUTATIONS

(71) Applicant: Tenstorrent AI ULC, Toronto (CA)

(72) Inventors: Ljubisa Bajic, Toronto (CA); Davor Capalija, Toronto (CA); Yu Ting Chen, Toronto (CA); Andrew Grebenisan, Oshawa (CA); Hassan Farooq, Courtice (CA); Akhmed Rakhmati, Ajaz (CA); Stephen Chin, Toronto (CA); Vladimir Blagojevic, Banjaluka (BA); Almeet Bhullar, Brampton (CA); Jasmina Vasiljevic, Toronto (CA)

(73) Assignee: Tenstorrent AI ULC, Toronto (CA)

( * ) Notice: Subject to any disclaimer, the term of this patent is extended or adjusted under 35 U.S.C. 154(b) by 1153 days.

(21) Appl. No.: 17/589,446

(22) Filed: Jan. 31, 2022

(65) Prior Publication Data

US 2023/0259579 A1 Aug. 17, 2023

(51) Int. Cl.
*G06F 17/16* (2006.01)
*G06N 3/044* (2023.01)
(Continued)

(52) U.S. Cl.
CPC ........... *G06F 17/16* (2013.01); *G06N 3/0464* (2023.01); *G06N 3/044* (2023.01); *G06N 3/0455* (2023.01); *G06N 3/08* (2013.01)

(58) Field of Classification Search
CPC ........ G06N 3/04; G06N 3/044; G06N 3/0442; G06N 3/045; G06N 3/0455; G06N 3/0463;
(Continued)

(56) References Cited

U.S. PATENT DOCUMENTS 4,972,314 A 11/1990 Getzinger
5,021,947 A 6/1991 Campbell
(Continued)

FOREIGN PATENT DOCUMENTS

CN 105181898 A 12/2015
CN 106250863 A 12/2016
(Continued)

OTHER PUBLICATIONS

Directed Graphs, Simon Fraser University, 2009 found at chrome-extension://efaidnbmnnnibpcajpcglclefindmkaj/https://www.sfu.ca/~mdevos/345/digraph (Year: 2009).*
(Continued)

*Primary Examiner* — Emily E Larocque
(74) *Attorney, Agent, or Firm* — Daylight Law, P.C.

(57) ABSTRACT

Methods and systems relating to reducing the number of computations required to execute an artificial neural network (ANN) are disclosed herein. A disclosed method includes: generating a summary of a set of data which is an input for a composite computation; executing a simplified composite computation, using the summary, to produce a simplified output; and executing a second simplified composite computation, using the simplified output, to produce a second simplified output which is a predictor. The second simplified composite computation is a simplification of a second composite computation. The composite computations are both part of a complex computation for the directed graph. The second composite computation depends on the composite computation in the directed graph. The method further includes suppressing, while executing the complex computation, a set of component computations from the second composite computation. The set of component computations are selected for suppression based on the predictor.

38 Claims, 9 Drawing Sheets

(51) Int. Cl.
G06N 3/0455 (2023.01)
G06N 3/0464 (2023.01)
G06N 3/08 (2023.01)

(58) Field of Classification Search
CPC .... G06N 3/0464; G06N 3/047; G06N 3/0475;
G06N 3/048; G06N 3/08; G06N 3/082;
G06F 17/16
See application file for complete search history.

(56) References Cited

U.S. PATENT DOCUMENTS

| | | | |
|---|---|---|---|
| 5,790,858 | A | 8/1998 | Vogel |
| 9,633,306 | B2 | 4/2017 | Liu et al. |
| 2013/0063453 | A1 | 3/2013 | Bloomfield |
| 2014/0075004 | A1 | 3/2014 | Dusen |
| 2015/0106310 | A1 | 4/2015 | Birdwell et al. |
| 2018/0046894 | A1 | 2/2018 | Yao |
| 2018/0137406 | A1 | 5/2018 | Howard et al. |
| 2018/0293486 | A1 | 10/2018 | Bajic et al. |
| 2019/0138896 | A1 | 5/2019 | Deng |
| 2020/0372361 | A1 | 11/2020 | Bejnordi et al. |
| 2021/0056422 | A1 | 2/2021 | Thakker et al. |
| 2021/0065052 | A1 | 3/2021 | Muralidharan et al. |
| 2024/0185565 | A1* | 6/2024 | Chen .................. G06Q 30/0631 |

FOREIGN PATENT DOCUMENTS

| | | | |
|---|---|---|---|
| WO | 2009142872 | A1 | 11/2009 |
| WO | 2020256836 | A1 | 12/2020 |

OTHER PUBLICATIONS

A. Vaswani et al., Attention is All You Need, 31st Conference on Neural Information Processing Systems (NIPS), 2017 (Year: 2017).*
L. Bajic, et al., Tenstorrent Compute substrate for Software 2.0, 2020 IEEE Hot Chips 32 Symposium (HCS), 2020 (Year: 2020).*
Extended European Search Report from EP Application No. 23154083.2 dated Jun. 27, 2023, 9 pages.
W. Xia, et al (2020). Fully Dynamic Inference With Deep Neural Networks. IEEE Transactions on Emerging Topics in Computing, 10, 962-972.

X. Wang, et al (2018). Skipnet: Learning dynamic routing in convolutional networks. In Proceedings of the European Conference on Computer Vision (ECCV) (pp. 409-424).
A. Davis, et al., "Low-Rank Approximations for Conditional Feedforward Computation in Deep Neural Networks", Available at: arXiv:1312.4461v4, Jan. 24, 2018, (Accessed on: Mar. 23, 2018), 10 pages.
Almahairi et al., "Dynamic Capacity Networks", Nov. 24, 2015, XP055479670, Retrieved from the Internet: URL: http://www.jmlr.org/proceedings/papers/v48/almahairi16.pdf, 10 pages.
Bengio et al., "Conditional Computation in Neural Networks for Faster Models", School of Computer Science, McGill University, Montreal, Canada, arXiv:1511.06297v2 [cs.LG] Jan. 7, 2016, 12 pages.
Dong et al., "More is Less: A More Complicated Network with Less Inference Complexity", Mar. 25, 2017, XP055758028, Retrieved from the Internet: URL:https://arxiv.org/pdf/1703.08651v1.pdf, 9 pages.
J. Zhu, et al., "LRADNN: High-Throughput and Energy-Efficient Deep Neural Network Accelerator using Low Rank Approximation," Design Automation Conference (ASP-DAC), 2016 21st Asian and South Pacific, Jan. 25-28, 2016, 6 pages.
M. Denil, et al., "Predicting Parameters in Deep Learning", NIPS'13 Proceedings of the 26th International Conference on Neural Information Processing Systems—vol. 2, pp. 2148-2156, Dec. 5-10, 2013.
Mahmoudzadeh et al., "Evaluation of Interpolation Effects on Upsampling and Accuracy of Cost Functions-Based Optimized Automatic Image Registration", Hindawi Publishing Corporation, International Journal of Biomedical Imaging, 2013, 19 pages.
N. Shazeer, et al., "Outrageously Large Neural Networks: The Sparsely-Gated Mixture-of-Experts Layer", Available at: arXiv:1701.06538v1, Jan. 23, 2017, (Accessed on: Mar. 23, 2018), 19 pages.
P. Judd, et al., "Reduced-Precision Strategies for Bounded Memory in Deep Neural Nets", Available at: arXiv:1511.05236v4, Nov. 17, 2015, (Accessed on: Mar. 23, 2018), 12 pages.
P. Judd, et al., "Stripes: Bit-serial deep neural network computing", Microarchitecture, 2016 49th Annual IEEE/ACM International Symposium, Oct. 15-19, 2016, 12 pages.
Y. Bengio, et al., "Estimating or Propagating Gradients Through Stochastic Neurons for Conditional Computation," Available at: arXiv:1308.3432v1, Aug. 15, 2013, (Accessed on: Mar. 23, 2018), 12 pages.
P. Utgoff, "Perceptron Trees: A Case Study in Hybrid Concept Representations", AAAI-88 Proceedings, 1988, 6 pages.

* cited by examiner

RUNTIME PREDICTORS FOR COMPUTATION REDUCTION IN DEPENDENT COMPUTATIONS

BACKGROUND

Machine intelligence systems represent one of the most computationally complex and energy intensive computation applications of the modern age. As artificial neural networks (ANNs) represent the bulk of current machine intelligence systems in use today, a significant amount of research and development has been invested in ways to make the execution of ANNs less energy intensive. ANNs take in an input tensor, conduct calculations using the input tensor and a set of network tensors, and produce an output tensor. The output tensor represents an inference generated by the network in response to the input. For example, if the ANN were an image classifier, the input could be an encoding of an image of a cat, and the output vector could be an inference indicating that the subject of the image was a cat. The reason these systems are so resource hungry is that the data structures they are operating on are generally very large, and the number of discrete primitive computations that must be executed on each of the data structures is likewise immense.

Machine intelligence systems represent a challenging environment both in terms of the number of computations that are required and the large data structures that must be moved between memory and the computation area of the system for those computations to be executed. The network data for a standard ANN can often comprise billions of discrete data entries. The network data can comprise weight vectors, filter vectors, and various other kinds of data based on the type of ANN involved. The network data defines the ANN and determines what output will be provide for a given input. The network data is usually organized into layers with the output of each layer serving as the input to the next layer. This makes ANNs difficult to parallelize as the computations for each layer are dependent upon the computations from each prior layer and generally cannot commence until the prior layers have been fully executed. In a traditional ANN, the layers are fully connected, which requires every element of the input vector to be involved in a calculation with every element of the weight vector. The resulting number of calculations involved is very large. Furthermore, the input data to the ANN, the network data for the ANN, and the execution data that is generated through the execution of one layer of the ANN to serve as inputs for the next layer of the ANN all need to be held in memory until they are used for computations in the next layer.

A developing area of research in the field of machine intelligence involves ways in which the number of computations required for generating an inference from an ANN can be reduced while still maintaining fidelity to a full execution of the ANN. Approaches in this field include those in which specific computations in the execution of an ANN are skipped at the time of execution of the ANN based on various factors. For example, specific approaches involve "helper layers" which can reduce the number of computations during the execution of the ANN based on the input data to the ANN. Additional approaches involve modifying the ANN prior to execution by pruning out network data that is not necessary for the execution of the network to thereby produce a different, modified, ANN that can be executed with fewer computations. These approaches are often referred to with terms such as "drop out" and "pruning" and are done during the initial training phase of the ANN as the appropriate network data for a given network is being learned.

SUMMARY

Methods and systems related to the field of artificial neural networks (ANN) are disclosed herein. The methods and systems disclosed include approaches for reducing the number of computations required to execute a given ANN. The execution of an ANN can require the execution of at least one composite computation. The methods and systems disclosed include neural network accelerators, or other computational devices for executing an ANN, which are loaded with a trained ANN and reduce the computational complexity of an execution of that trained ANN while maintaining fidelity to the full execution of the ANN. The computational complexity of an execution of an ANN can be reduced by suppressing component computations of one or more composite computations that must be executed as part of the execution of the ANN.

In specific embodiments of the invention, methods are provided for reducing computations in the execution of an ANN where all steps of the methods are conducted at runtime-during execution of the ANN. These methods involve executing a simplified composite computation to produce a predictor. The simplified composite computation can be a simplification of a composite computation and the composite computation can be part of a complex computation required for the execution of the ANN. The predictor is indicative of the salience of specific computations and can be used to suppress less salient computations during an execution of the complex computation. The predictor can be generated more than one layer downstream of the composite computation and can provide significant reductions in computations when applied to suppress computations back upstream as most ANNs have several upstream computations whose effects converge at a downstream portion of the ANN. The resulting reduction of computations is thereby amplified and is determined based on specific inputs to the ANN to produce a reduction in computations that is narrowly tailored to a given execution of the ANN.

In specific embodiments of the invention, a computer-implemented method is provided. The method is conducted during an execution of a directed graph. The method includes generating a first summary of a first set of data. The first set of data is an input for a first composite computation. The method also includes executing a first simplified composite computation, using the first summary, to produce a first simplified output. The first simplified composite computation is a simplification of the first composite computation. The method also includes executing a second simplified composite computation, using the first simplified output, to produce a second simplified output. The second simplified output is a predictor. The second simplified composite computation is a simplification of a second composite computation. The first composite computation and the second composite computations are both part of a complex computation for the directed graph. The second composite computation depends on the first composite computation in the directed graph. The method also includes suppressing, while executing the complex computation, a set of component computations from the second composite computation. The set of component computations from the second composite computation are selected for suppression based on the predictor.

In specific embodiments of the invention, a processing core is provided. The processing core comprises a processor and one or more computer readable media storing instructions which, when executed by the processor, cause the processing core to: generate a first summary of a first set of data, wherein the first set of data is an input for a first composite computation; execute a first simplified composite computation, using the first summary, to produce a first simplified output, wherein the first simplified composite computation is a simplification of the first composite computation; execute a second simplified composite computation, using the first simplified output, to produce a second simplified output, wherein the second simplified output is a predictor, wherein the second simplified composite computation is a simplification of a second composite computation, wherein the first composite computation and the second composite computations are both part of a complex computation for the directed graph, and wherein the second composite computation depends on the first composite computation in the directed graph; and suppress, while executing the complex computation, a set of component computations from the second composite computation, wherein the set of component computations from the second composite computation are selected for suppression based on the predictor.

In specific embodiments of the invention, a system is provided. The system comprises a means for generating a first summary of a first set of data, wherein the first set of data is an input for a first composite computation. The system further comprises a means for executing a first simplified composite computation using the first summary to produce a first simplified output, wherein the first simplified composite computation is a simplification of the first composite computation. The system further comprises a means for executing a second simplified composite computation, using the first simplified output, to produce a second simplified output, wherein the second simplified output is a predictor, wherein the second simplified composite computation is a simplification of a second composite computation; wherein the first composite computation and the second composite computation are all part of a complex computation for a directed graph; and wherein the second composite computation depends on the first composite computation in the directed graph. The system further comprises a means for suppressing, while executing the complex computation, a set of component computations from the second composite computation, wherein the set of component computations from the second composite computation are selected for suppression based on the predictor.

BRIEF DESCRIPTION OF THE DRAWINGS

In the figures, usage of the same reference number is meant to refer to the same element, unless indicated otherwise.

DETAILED DESCRIPTION

Figure 1:
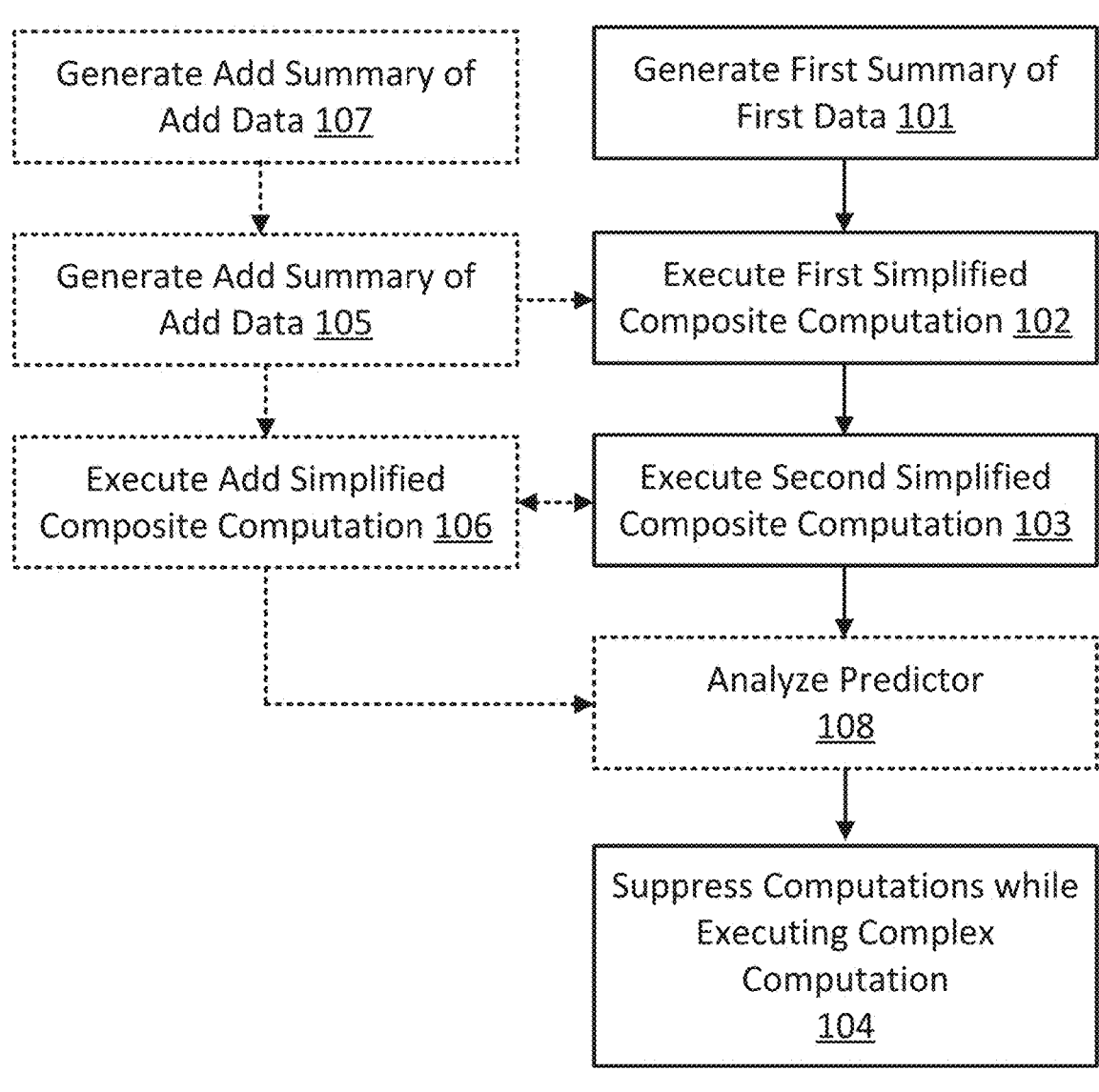
FIG. 1 illustrates a flowchart of a set of methods, in accordance with specific embodiments of the invention disclosed herein.

Methods and systems related to the field of artificial neural networks (ANN) in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Specific embodiments of the invention disclosed herein are described with reference to a complex computation in the form of mathematical operations that must be conducted, using a set of computation data, in order to execute an artificial neural network (ANN). The ANN could be as a convolutional neural network (CNN), a residual neural network (ResNet), a recursive neural network (RNN), an attention network, an embedding, or any form of trained directed graph. As such, the complex computation can be required to generate an inference from the ANN in response to a given input. The execution of the ANN can be conducted while training the ANN during a training phase. In the alternative or in combination, the execution of the ANN can be conducted after training the ANN while the network is deployed in a machine intelligence application. For example, the ANN could be deployed on an edge device such as a smartphone to conduct speech recognition on incoming audio files or on a server to run a recommendation engine for the feed of a social network application. The complex computation can include at least one composite computation which in turn comprises at least one component computation. For example, the composite computation could be a matrix multiplication computation and the component computations could include the multiplications operations conducted using the individual elements of the matrix.

The computation data for the execution of an ANN can include the input data to the ANN, the execution data (e.g., activation data that is passed from one layer of the network to the next), the network data (e.g., weight or filter data) that defines the network, and the output data which is ultimately produced from the execution of the ANN. If the execution of the ANN is conducted while training the ANN, the input data can be a training input which can be associated with a label (i.e., an expected response of an appropriately trained network) to be used in a supervised learning routine. The computation data can be managed in blocks of commonly routed and addressed individual data elements.

FIG. 1 illustrates a flowchart 100 of a set of methods in accordance with specific embodiments of the invention disclosed herein. In specific embodiments of the invention, all the steps shown in flowchart 100 are conducted during the execution of an ANN and can be used to reduce the number of computations required to execute the ANN. The execution of the ANN can be conducted after the ANN has been trained and can result in the generation of an inference by the trained ANN. The execution of the ANN can also be conducted while the ANN is being trained and result in the generation of an inference that can be compared against an expected output to help modify and train the network.

Figure 2:
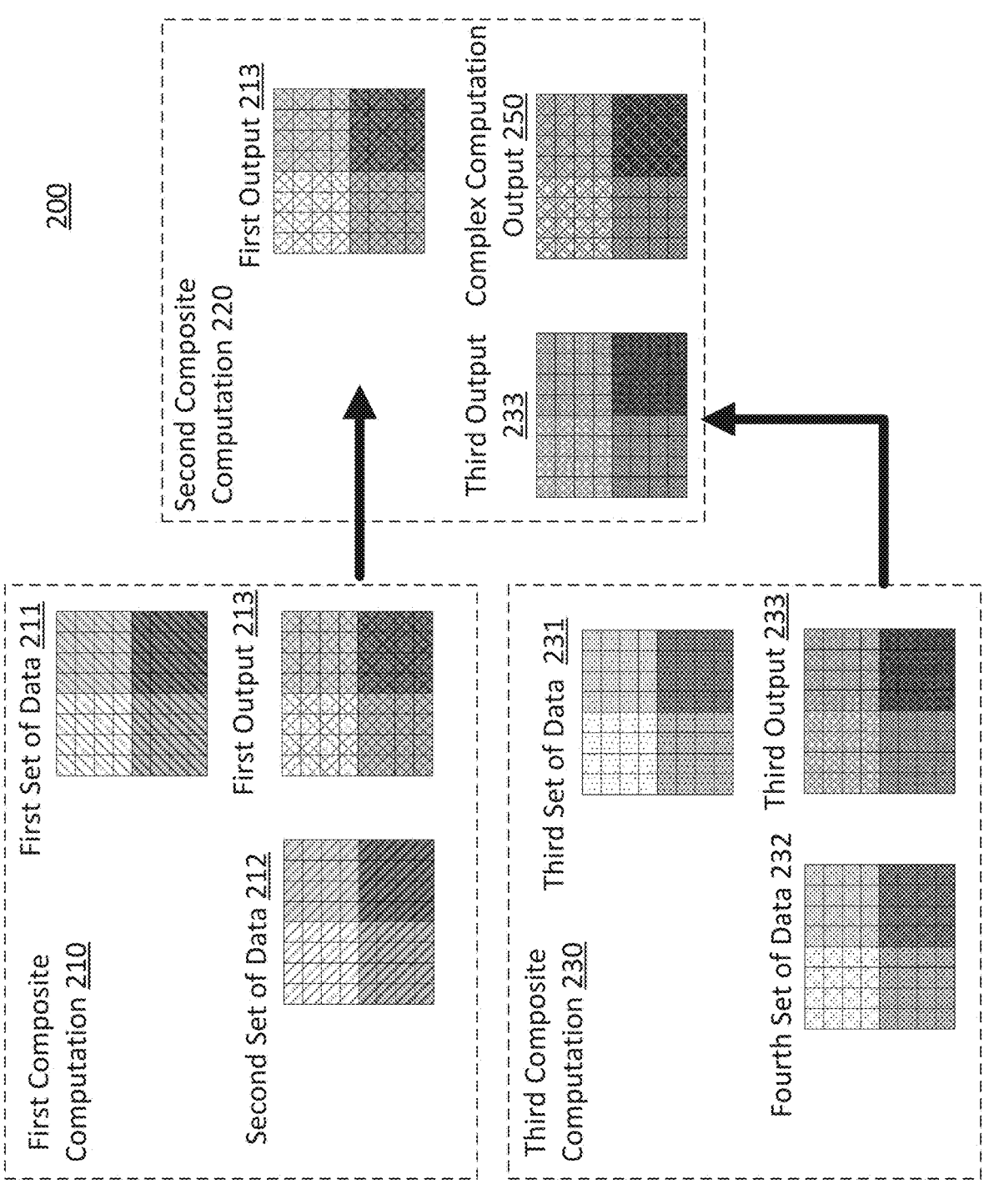
FIG. 2 illustrates an example of a complex computation executed in accordance with the related art.

An example of a complex computation to which the methods in flowchart 100 can be applied is illustrated in FIG. 2. FIG. 2 illustrates an example of a complex computation 200 executed in accordance with the related art. As illustrated, the complex computation 200 can include one or more composite computations, such as composite computations 210, 220 and 230. Each composite computation can involve one or more operations on one or more sets of data. In the example of FIG. 2, a composite computation 210 includes an operation involving a first set of data 211 and a second set of data 212, composite computation 230 includes an operation involving a third set of data 231 and a fourth set of data 232, and composite computation 220 includes an operation involving the outputs 213 and 233 of the two previous composite computations 210 and 230. The operations can be matrix multiplications or other operations.

The example illustrated in FIG. 2 is a non-limiting example of a complex computation to which the present invention could be applied and will be used as a reference throughout this disclosure to explain how the present invention would work for such complex computation. However, this is not a limitation of every embodiment of the invention. Specific embodiments of the present invention can be applied to any complex computation involving any number of composite computations, any kind of operations and any number of data sets of any size.

The numerals "first", "second", "third", etc. will be used to identify the various composite computations and sets of data in accordance with the example given in FIG. 2 for explanatory purposes only. However, these identifiers do not limit the scope of the invention and do not represent any special order in which such computations occur, or such data is provided. For example, second composite computation 230 could occur before or at the same time as composite computation 220 so that the output of the third computation can be used as an input for the second computation. Similarly, "first" does not necessarily mean the absolute "first" but can refer to a relative "first" for the given example. For example, "first composite computation 210" is not necessarily the "first" composite computation of the illustrated complex computation (nor the starting point of any directed graph for the complex computation). The identifier "first" is used, however, to distinguish it from the other computations in the same example and not to attribute it any special quality.

In the example of FIG. 2, the first composite computation 210 involves a matrix multiplication between the first set of data 211 (an 8×8 matrix in this example) and the second set of data 212 (an 8×8 matrix in this example). The resulting output 213 is therefore also an 8×8 matrix and the operation would include calculation of all 64 elements of the output matrix from all 64 elements of each of the input matrices. In the same way, an output 233 can be obtained from input set of data 231 and input set of data 232, and finally an output 250 can be obtained from outputs 213 and 233 used as inputs in composite computation 220. The output 250 can be the complex computation output as illustrated in this example, or can be an intermediate output to be moved forward according to the directed graph of the computation until a final outcome is obtained. Again, the example of FIG. 2 is for illustrative purposes only and any complex computation, with any number of composite computations, involving any number of operations and data sets of any size, could be used.

With the approaches proposed by specific embodiments of the present invention, it could be possible to suppress one or more component computations from one or more composite computations in a complex computation (such as complex computation 200 in FIG. 2), which could result in a more efficient execution of the complex computation than that shown in FIG. 2. The methods in flowchart 100 in FIG. 1 indicate a possible alternative to achieving this result, in accordance with specific embodiments of the invention. In specific embodiments of the invention, a system, such as the system that will be described with reference to FIG. 8, includes means for performing the various steps illustrated in flowchart 100. The means for performing the various steps can include one or more processing cores, such as a network of processors, accessing instructions stored in memory for executing the method steps.

Flowchart 100 starts with a step 101 of generating a summary of a set of data. The data in the sets of data can be network data, execution data, and/or any other data involved in the complex computation as described before in this disclosure. The composite computation can be part of a complex computation for a directed graph (e.g., composite computation 210 in FIG. 2). The set of data can be an input to any composite computation in the complex computation. For example, the summary can be a first summary of a first set of data, and the first set of data can be an input for a first composite computation of a complex computation (e.g., first set of data 211 in composite commutation 210 in FIG. 2).

The summaries of the data can be generated in various ways in step 101. For example, the summaries can be generated using a sampling operation. The sampling operation can be conducted across a data structure or repeatedly across subsets of the data structure. The subsets can be specific dimensions of the data structure, span different dimensions of the data structure, or divide up specific dimensions of the data structure. The sampling can be random or targeted. The sampling could select for the largest value or values across the data structure or subsets thereof. The sampling could also take the average, mean, or medium of values in the data structure, or values in subsets of the data structure. For example, the sampling could be an average pooling operation on various subsets of the data structure with the average pooled values representing the summary of the original data structure. As another example, the sampling could be a Top-K operation which selects the "K" values with the largest magnitude in a data structure to represent the rest of the values from the data structure. As another example, the sampling could be a random sampling which selects a fixed number of values from different portions of the data structure to represent the remaining values from the same portion. The summaries can also involve the application of a transform to the data to reduce the dimensionality of the data structure. For example, the transform could produce a lower rank approximation of a matrix or provide a linear approximation of a data structure by producing a linear representation of the data values and using the coefficients of the linear representation in place of the data structure.

In specific embodiments of the invention the summaries will be generated such that the summaries of the different sets of data (e.g., network data and execution data) are still compatible for the operation that the sets of data are used in during a standard execution of the composite computation. For example, if the composite computation were a matrix multiply operation as illustrated in the example of FIG. 2, the summaries could be generated from the original matrices such that the inner dimensions of the resulting summaries were the same number. In this manner, the summaries can be compatible for the same operation the original data was used in because the inner dimensions still match. As another example, if the composite computation were a convolution operation, the summaries could be generated from the original tensors such that they ended up with the same dimensionality (e.g., two four dimensional tensors being reduced into two three dimensional tensors).

Figure 3:
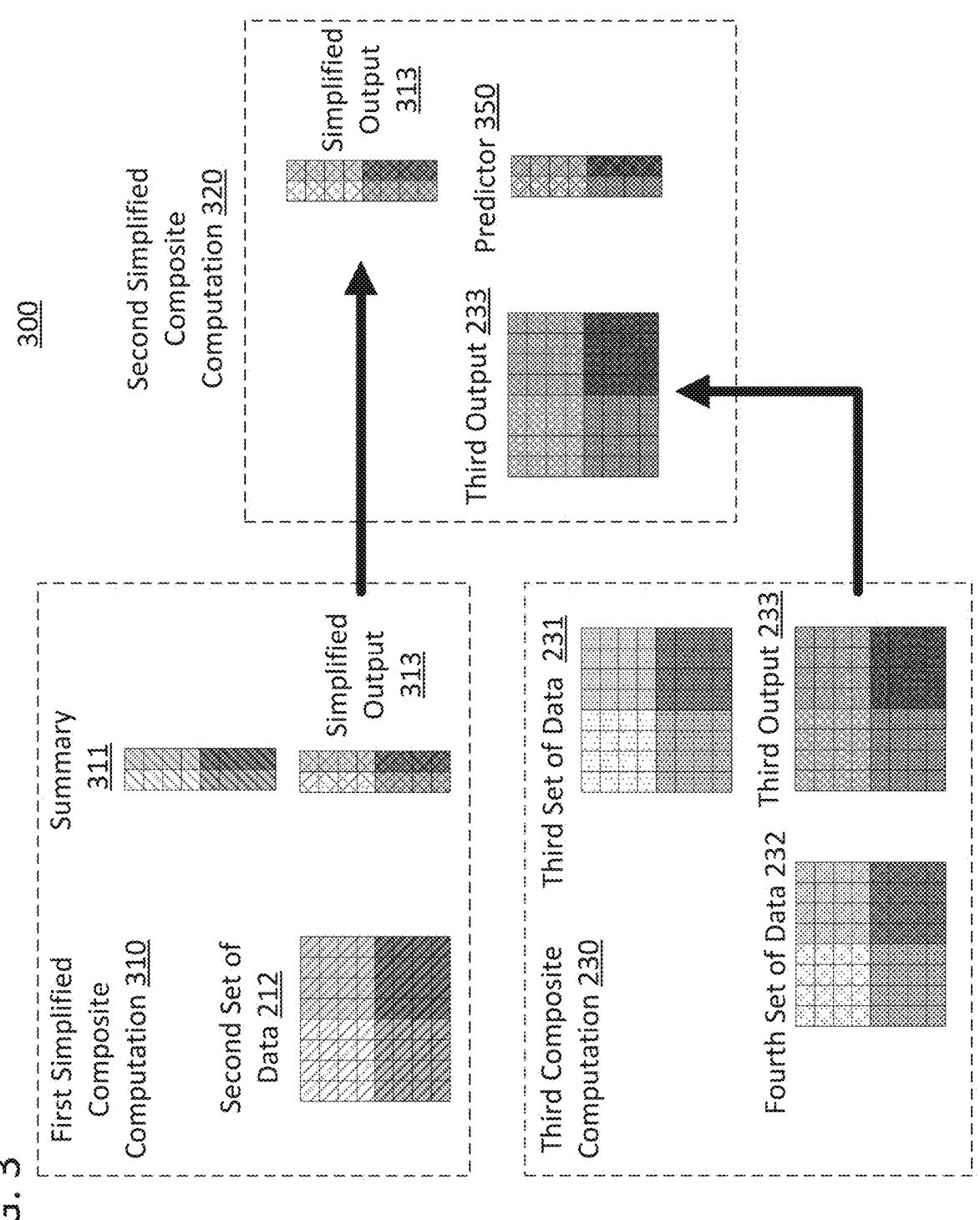
FIG. 3 illustrates an example of a simplified complex computation in which a summary has been generated, in accordance with specific embodiments of the invention disclosed herein.

FIG. 3 illustrates an example of a simplified complex computation 300 in which a summary 311 has been generated, in accordance with step 101 of flowchart 100. Simplified complex computation 300 can be a simplified version of complex computation 200. As illustrated in this example, a summary 311 of the first set of data 211 has been generated. The summary 311 has a number of rows equal to the number of columns in the second set of data 212 so that the two sets of data are still compatible for multiplication. The summary 311 has, however, fewer columns than the original matrix representing the first set of data 211. As a result, the number of total component computations in the composite computation can be reduced, and the outcome of such component computation can be a smaller data structure.

In the illustrated example, summary 311 has been generated by conducting an average pooling operation on each quadrant of the first data set 211. For example, each of the four subsets of four entries in each quadrant of first data set 211 could have their entries summed and divided by four to generate the representative value for that subset in the summary 311. In this example, the summary 311 has been generated so that the inputs are still compatible for matrix multiplication (i.e., summary 311 has a number of rows equal to the number of columns in the set of data 212). However, this is not a limitation of the present invention. Summaries can be generated so the inputs are compatible for any kind of operation, or can be transformed so that they are compatible for further operation. For example, the transpose of a summary matrix can be determined for the summary to be compatible for the required calculations of the simplified computation in which it will be used.

Flowchart 100 continues with a step 102 of executing a simplified composite computation. The execution of the simplified composite computation can then produce a simplified output. For example, step 102 can include executing a first simplified composite computation (e.g., 310 in FIG. 3) to produce a first simplified output (e.g., 313 in FIG. 3). The simplified composite computation can be executed using the first summary (e.g., 311 in FIG. 3). In this way, the first simplified composite computation in step 102 can be a simplification of the first composite computation 210. As illustrated in FIG. 3, the output resulting from the first simplified composite computation 310 in this example is a simplified output 313 in the form of an 8×2 matrix. In this way, the number of component computations (e.g., individual operations) performed to obtain such output can be reduced as a result of using the summary 311 instead of the full set of data 211. Furthermore, the output obtained from the simplified component computation is likewise simplified.

Flowchart 100 continues with a step 103 of executing an additional simplified composite computation, such as second simplified composite computation 320 in FIG. 3. The second simplified composite computation 320 can be a simplification of a second composite computation, such as second composite computation 220. As explained, the first composite computation 210 and the second composite computations 220 can both be part of a complex computation for the directed graph, such as complex computation 200/300. The second composite computation 220 can depend on the first composite computation 210 in the directed graph so that the second composite computation can, for example, use an output of the first composite computation as an input. In this way, the second simplified composite computation 320 can be the simplification of the second composite computation 220 of FIG. 2, executed using the first simplified output (e.g., 313) instead of the first output 213. The second simplified composite computation 320 can produce a second simplified output, such as a second simplified output in the form of predictor 350. The simplified output can be a simplified output of the complex computation if the simplified composite computation from which it was obtained is the final computation of the complex computation or it can be an intermediate output to be moved forward to a subsequent computation, as explained with reference to simplified output 313.

In specific embodiments of the invention, the simplified output of a final composite computation in a complex computation can be a predictor. For example, the second simplified output in FIG. 3 can be predictor 350. In this way, step 103 can include generating a prediction. The prediction can be generated using the summary of set of data. The prediction can be a prediction of the value or values that would be produced by the composite computation in a standard execution (i.e., if every component computation of the composite computation was fully executed). In specific embodiments of the invention, the prediction can be generated using a predictor computation with the summary of the set of data generated in step 101 as an operand. The composite computation and the predictor computation can be the same type of computation. For example, if the composite computation were a matrix multiply operation with the original data as operands (as in the example of FIG. 2), the predictor computation could also be a matrix multiply operation with the summary data as operands (as in the example of FIG. 3).

In specific embodiments of the invention, generating the prediction is less computationally intensive than executing the composite computation. The prediction can be a rough estimate gleaned through a different operation than the composite computation itself. However, the prediction also can be generated using the same type of operation as the composite computation itself. For example, if the composite computation is a matrix multiplication, the prediction can be a matrix multiplication with significantly smaller data structures. Depending upon how aggressively the operation to generate the summaries condenses the data structures, the operation can be vastly simple. For example, if the network data and execution data were each 512×512 matrices and the summary was an average pool 4 operation which generated two 128×128 summaries, the resulting prediction could be calculated using 1.5% the number of computations required for the original computation.

In specific embodiments of the invention, the summaries generated in step 101 can be retained after the prediction is generated in step 103. Specific ANNs, and some other complex computations, exhibit a high degree of redundant data usage. As such, portions of execution data may be involved with multiple portions of network data and vice versa in different composite computations of an execution of an ANN. As such, the step of generating the summaries may be skipped in later composite computation involved in the execution of the same ANN if the summary for certain computation data was generated previously and is already stored in association with its data.

Flowchart 100 continues with a step 104 of suppressing a set of component computations. The suppressing in step 104 can occur while executing the complex computation. In specific embodiments of the invention, the step can be conducted based on the prediction and after the prediction has been generated. The component computations suppressed in step 104 can be from any of the composite computations of the complex computation. The set of component computations that are suppressed can be selected for suppression based on the predictor. In specific embodiments of the invention, the component computations are suppressed from composite computation which were used to generate the predictor. For example, composite computation(s) that were simplified in order to generate the prediction can be suppressed when they are executed in their non-simplified form. With reference to FIG. 3, component computations can be suppressed from the second composite computation 220. As another example, computations in the complex computations that depend on the composite computation(s) that were simplified or computations in the complex computations that the composite computation(s) that were simplified depend on can be suppressed based on the prediction. With reference to FIG. 3 and as will be further explained in this disclosure, the component computations can be suppressed from the third composite computation 230.

Computations can be suppressed in step 104 in various ways as will be explained below in more detail. For example, computations can be suppressed by not conducting the operation at all (e.g., replacing an output with zero). Computations can also be suppressed by conducting the operations in a lower resolution or simplified execution such as by approximating values and omitting part of the individual operations needed for a certain output. This simplification can also lead to the simplification or suppression of downstream computations. For example, zeroes in multiplications can be skipped if the system is designed to do that.

Step 104 can include executing a composite computation such as composite computations 210, 220, and 230 in FIG. 2. As previously explained, the composite computations can be computations requiring the execution of multiple component computations. Depending upon the architecture of the hardware where the computation is going to be executed (e.g., processor), the composite computation could be specified as a single instruction or the individual component computations could be specified as individual instructions. Regardless, multiple discrete computations, in the form of component computations, can be executed by a hardware unit (e.g., a processor) to execute the component computation. For example, the composite computation could be a matrix multiply operation and the component computations could be the multiply operations of the various elements of the two matrices in the matrix multiply operation.

Step 104 of suppressing a set of component computations of the composite computation can also include selecting one or more component computations for suppression. The sets of component computations can be selected based on the prediction generated in step 103. The prediction can be used in various ways to provide information regarding the saliency of the various component computations that make up the composite computation. As such, a prediction can be used to assure that the most salient component computations are executed while the less salient component computations are not. Accordingly, the complexity of the composite computation can be reduced by reducing the number of computations which must be executed while at the same time maintaining fidelity to the fully executed composite computation. Suppressing the component computations can include not conducting the computations at all, providing a substitute value in place of the output of the computation, or executing the computation with reduced resolution.

The selection of which component computations are suppressed and which are executed based on the prediction can be conducted in various ways. Generally, if portions of the original operand data were summarized (e.g., in step 101) and those summaries were associated with a prediction value with a low magnitude, while other portions of the original operand data were in the same way associated with a prediction value with a high magnitude, component computations utilizing that first type of original operand data could be suppressed. However, within that general approach there are numerous methods for selecting component computations to be suppressed. For example, the comparison of which original operand data contributed to a prediction with the highest magnitude could be conducted one time across the entire set of operand data or several times amongst subsets of the set of operand data. As another example, even once a particular set of operand data was found to be associated with a lower magnitude prediction value, selecting from among that operand data to determine which computation should be suppressed can be conducted in various ways. For example, if the sampling of the operand data was an average pooling operation, the computations to be suppressed could be selected based on a random selection of the operand data. However, if the sampling of the operand data had randomly selected specific values, component computations associated with those specific values could be suppressed.

A specific application of the methods of FIG. 1 could involve the execution of multiple layers of an ANN where the output of each layer is required as an input for the next layer. In this application, the composite computation executed in step 104 above could be a composite computation required for the execution of one layer of the ANN. For example, the composite computation could be a matrix multiply operation and the set of component computations of that composite computation could be multiplication operations of the data elements in the matrixes. In this example, the approach illustrated in FIG. 1 could be used to reduce the complexity of a large matrix multiply operation required for the execution of a fully connected layer in an ANN with network data elements on the order of millions or billions resulting in a major decrease in computation time. However, the process could also be repeated multiple times during the execution of an ANN to realize even greater savings in computational resources.

In specific embodiments of the invention, the methods described with reference to flowchart 100 can be executed repeatedly as a complex computation, such as the execution of an ANN, is executed. For example, the composite computation executed in step 104 could be the execution of a layer, or portion thereof, in an ANN and the output data of that computation could take the place of the execution data in a following iteration of the method. Alternatively, the composite computation executed in step 104 could be a partial execution of a layer in an ANN and the output data of that computation could be stored temporarily while the same input data was utilized with another portion of network data. In such an approach, step 101 could be skipped as the summary of the execution data may have been already made available from a prior iteration and could have been stored temporarily in memory. Alternatively, the composite computation executed in step 104 could be a partial execution of a layer in an ANN using a portion of the overall input to the layer, and the output data of the computation could be stored temporarily while another portion of the overall input to the layer was used in place of execution data. In such an approach the same network data may be used with the new execution data. However, in such an approach new network data may also be required.

Figure 4:
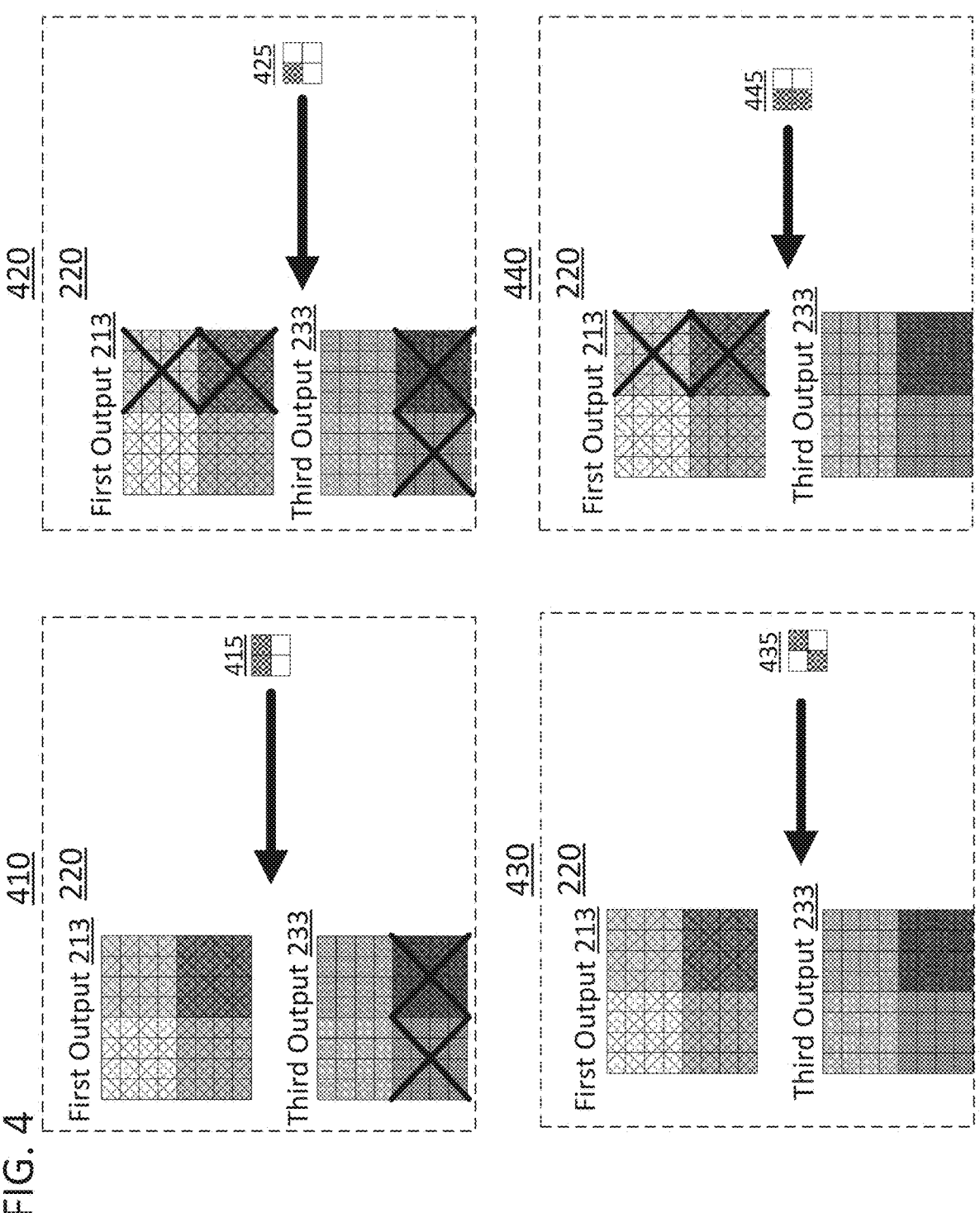
FIG. 4 illustrates non-limiting examples of suppressing computations based on a predictor, in accordance with specific embodiments of the invention disclosed herein.

FIG. 4 illustrates non-limiting examples (410, 420, 430, and 440) of suppressing computations based on a predictor (415, 425, 435, 445), in accordance with specific implementations of step 104 of flowchart 100. The predictors (415, 425, 435, 445) could have been generated by conducting steps 101-103 of flowchart 100 as explained before in this disclosure. As illustrated, different prediction patterns can result in different suppression of computations. In all the examples, the input at the top of the composite computation box can be considered the right input and the input at the bottom can be considered the left input for calculation purposes. The examples 410, 420, 430, and 440 can all be examples of a composite computation such as second composite computation 220 in FIG. 2, where the inputs are outputs from previous composite computations (e.g., the first output 213 of a first composite computation 210 and the third output 233 of a third composite computation 230 are inputs for composite computation 220).

Different prediction patterns are illustrated in the various examples in FIG. 4 while the same input sets of data are being used. The difference in the prediction patterns is given for explicative purposes only as it could be expected that the predictors were similar if the input sets of data are the same, although the predictors could be slightly different depending on the operations used to summarize the data and whatever alternative composite computations contributed to the generation of each predictor.

In the examples of predictors illustrated in FIG. 4, white boxes are being used to represent less "important" or "salient" computations while shaded boxes are being used to represent more "important" or "salient" computations. The saliency of the computations can be given by multiple factors such as the values obtained from the computations. For example, white boxes could represent zero or non-sparse values with a low saliency while filled boxes could represent nonzero or sparse values with a relatively higher degree of saliency. In keeping with the example of a predictor for composite computations in the form of matrix multiplications, if the predictor indicates that one or more computations are likely to outcome a zero value, the computations associated to such outcome can be suppressed based on the predictor, so that there is no need to execute such computations. Similarly, the saliency of the computations can be given by reference values or thresholds. In this way, "salient" values can be those which fall or do not fall under a certain threshold. The threshold can be, for example, a known or expected value for the computations (for example during a training phase where the outcome may be known). The saliency of the computations can also be given by the type of operations being conducted on the data, so that a certain kind of operation is prioritized or suppressed. The saliency of the computations can be based on any factor as determined for a given application, so that regardless of what is determined to be salient for a given scenario, the predictor can be used to identify computations that will potentially contribute in a meaningful way (shaded boxes in the example of FIG. 4) or will not potentially contribute in a meaningful way (white boxes in the example of FIG. 4) to the outcome that such scenario would produce if no computations were being suppressed.

The first example 410 in FIG. 4 illustrates a predictor 415 which indicates that the two top quadrants of the data structure have a higher degree of salience (according to the notation being used for the predictors in FIG. 4, where a lower degree of saliency (e.g., zero values or values below a threshold) is represented with white boxes, and higher degree of saliency (e.g., non-zero values or values above a threshold) is represented with shaded boxes). In this case, computations associated to the portions of the predictor indicating a lower degree of saliency can be suppressed. In the example of the composite computation being a matrix multiplication, this could include suppressing component computations in composite computation 220 that generate the less significant values according to the predictor (e.g., computations that involve the bottom quadrants of the set of data 233 which would ultimately be used to generate the bottom portions of the output/predictor), as those values/computations would potentially not impact the outcome of the composite computations, according to the predictor. Additionally, since the set of data 233 was obtained as the output of another composite computation (third composite computation 230 in FIG. 2), such composite computation can also be simplified by suppressing component computations that would generate the data elements that are not going to be used for further computations (i.e., the computations that involve the bottom quadrants of data set 232 in composite computation 230 (in FIG. 2) can be suppressed based on the predictor 415, as those computations would generate the unneeded data elements in the bottom quadrants of data set 233).

The second example in FIG. 4 illustrates a predictor 425 which indicates that the top-left quadrant has a higher degree of salience. In this case, as in the previous example, computations associated to the portions of the predictor indicating lower degree of saliency can be suppressed. This example illustrates a more aggressive suppression approach in which the suppressed component computations can involve data from different sets of data (i.e., computations that involve data elements in the bottom quadrants of output 233 (which may also be referred to as set of data 233) and/or computations that involve data elements in the right quadrants of output 213 (which may also be referred to as set of data 213)). This could also mean that component computations from two different composite computations (e.g., 220 and 230 in FIG. 2) could be suppressed based on the predictor. In a less aggressive approach, the predictor could be used to suppress some, but not all the computations that are potentially less significant. In the illustrated example, component computations in composite computation 220 involving the data elements in the right quadrants of set of data 213 could be suppressed, and/or computations involving the data elements in the bottom quadrant of the set of data 233 could be suppressed as they are indicated as potentially not significant based on the predictor. Additionally, since the respective sets of data (213 and 233) were originated from two previous composite computations (composite computations 210 and 230 in FIG. 2, respectively), such composite computation could also be simplified by suppressing computations that would generate the data elements that are not going to be used for future computations (e.g., data elements in the right quadrants of 213 and/or data elements in the bottom quadrants of 233). Thus, this example illustrates a case in which multiple (three in this case) different composite computations can be simplified based on a predictor. This example also illustrates how the predictor can be used to flow back through the chain of composite computations and be used to simplify not only the composite computation of which the predictor is a simplified output of but more composite computations that will ultimately impact the final output.

The third example in FIG. 4 illustrates predictor 435 which indicates that the top-right and bottom-left quadrants of the data structure have a higher degree of salience. In this case, as in the previous examples, computations associated to the portions of the predictor indicating lower degree of saliency can be suppressed. In this example, however, the same portions of the input sets of data 212 and 233 are used for less significant and for more significant computations (i.e., each of the data elements in the sets of data is being used for at least some of the salient computations). Even if all the data elements are used for the resulting simplified computation, the overall number of components computations is reduced by suppressions based on the predictor in that the computations that would generate the less salient values, according to the predictor, can be suppressed in composite computation 220. As opposed to the prior example 420, in this example the previous composite computations 210 and 230 are not simplified as all the data elements in the output of such computations are needed for composite computation 220 to take place, even in its simplified form.

The fourth example in FIG. 4 illustrates a predictor 445 which indicates that the left quadrants of the data structure have a higher degree of salience. In this case, as in the previous examples, computations associated to the portions of the predictor indicating lower degree of saliency can be suppressed. In this example, this could include suppressing component computations in composite computation 220 that involve the data elements in the right quadrants of the first set of data 213, as those values/computations would generate the values for the portions indicated as less salient by the predictor, and therefore would potentially not impact the outcome of the composite computations. Additionally, since the set of data 213 was obtained as a result of a previous composite computation 210, such composite computation could also be simplified by suppressing computations that would generate the data elements in set of data 213 which will not be used for further computations (e.g., the computations that generate the values in the right quadrants of set of data 213).

Figure 5:
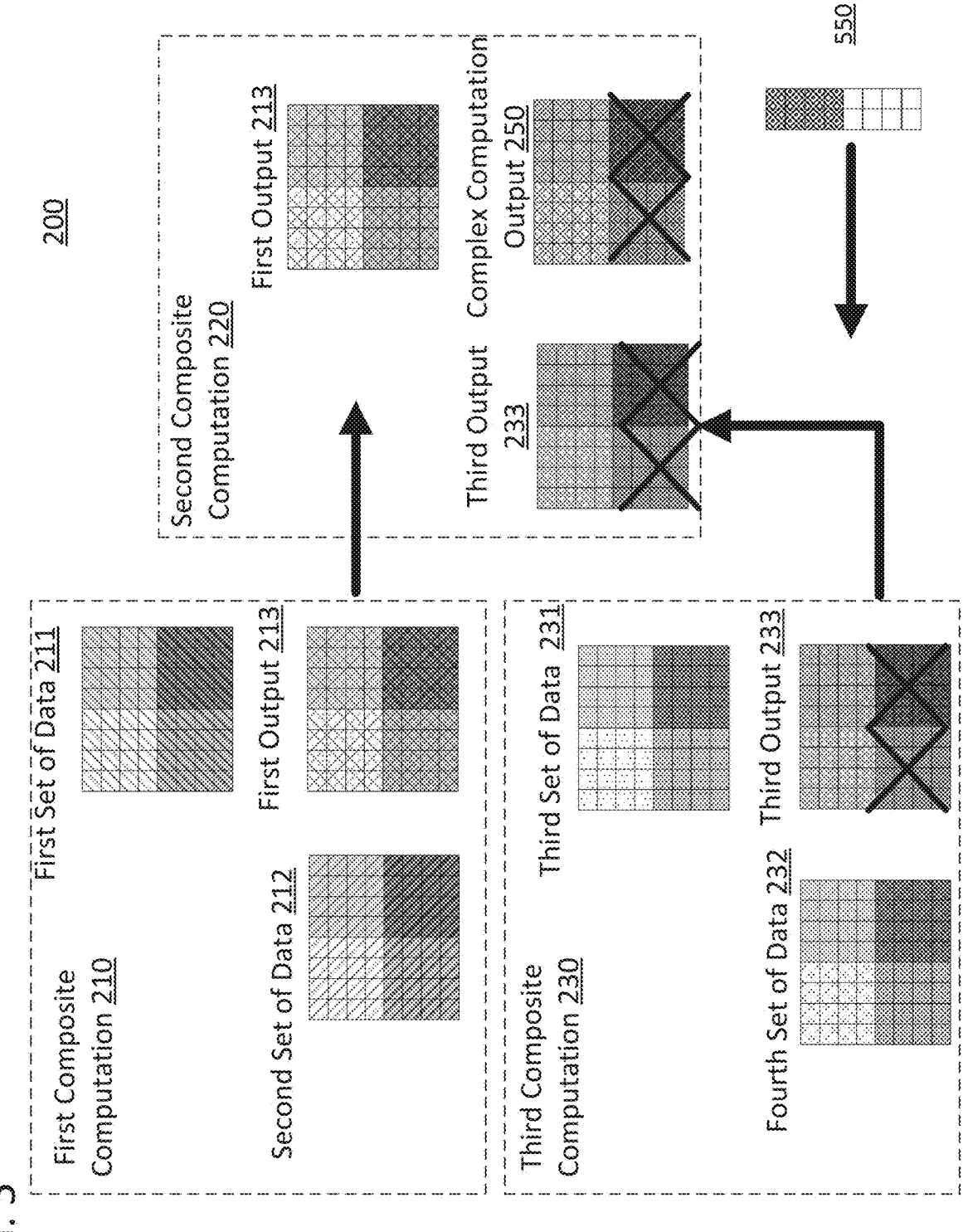
FIG. 5 illustrates a more detailed example of an implementation in which various composite computations back in the chain of composite computations can be simplified based on the predictor, in accordance with specific embodiments of the invention disclosed herein.

FIG. 5 illustrates a more detailed example of an implementation of step 104 in accordance with specific embodiments of the invention, where various composite computations back in the chain of composite computations can be simplified based on the predictor. The composite computations illustrated in FIG. 5 can be the same introduced with reference to FIG. 2. A predictor 550 has been generated (for example by performing steps 101-103 of flowchart 100) and indicates that the top portion of the data structure has a higher degree of salience (shaded portion). As explained, component computations that generate the data elements in the bottom portion of the data structure can be suppressed. This can include simplifying composite computation 220 by suppressing component computations that involve the data elements in the lower portion of set of data 233. This could also include, as explained before in this disclosure, a simplification of a composite computation back in the chain of component computations. For example, composite computation 230 can be simplified by suppressing the component computations that would generate the data elements in the bottom portion of set of data 233, which would in turn simplify the subsequent composite computation 220 as the input (data set 233 as generated by composite computation 230) would be already simplified. In this way, the predictor can be used to simplify any number of composite computations throughout the directed graph by suppressing component computations that will not ultimately contribute to the values indicated as salient by the predictor.

In specific embodiments of the invention, flowchart 100 can also include an optional step 108 of analyzing the predictor. Step 108 can be conducted as part of step 104 to select computations for suppression, or as an independent step. Step 108 can be conducted for any predictor/simplified output in the computation. For example, step 108 can be conducted after step 102, after step 103, after step 106, and/or any time a simplified output/predictor is generated. The predictor can be analyzed to determine component computations than can be suppressed. For example, the predictor can be analyzed to find one or more salient portions (such as the salient portions illustrated with reference to the predictor in FIG. 4), and the set of component computations can be selected for suppression based on a distribution of the set of salient portions (as also illustrated in the examples in FIG. 4 and FIG. 5). As explained with reference to FIG. 4, the distribution patterns of the predictor can indicate portions of the original sets of data that are not necessarily relevant to the output of the complex computation. Therefore, analyzing such a predictor to determine a pattern (e.g., degree of saliency of the various data elements and their distribution in the predictors' data structure) can be useful to determine which computations to suppress and/or which data elements are not essential. In specific embodiments of the invention, analyzing the predictor in step 108 can include performing an operation on various portions of the predictor. For example, step 108 can include using a top-k operation on a set of portions of the predictor to find the set of "k" most salient portions.

With reference back to the example of FIG. 5, as illustrated, the salient portions are in one half of the predictor 550. In this case, the saliency can be determined by performing step 108, and step 104 can include suppressing, while conditionally executing the complex computation, at least half of the component computations from one of the composite computations (e.g., from composite computation 230 as explained). The set of component computations from the composite computation can be selected for suppression based on the predictor, and more specifically based on the analyzing of the predictor to identify salient portions.

The selection of computations for suppression and the manner in which the selected computations are suppressed can be based on an analysis of the predictor. As shown in FIG. 1, the methods can include an optional step 108 of analyzing the prediction. This analysis can be used to determine which portions of the predictor are salient, and in turn, which component computations to suppress. The analysis of the predictor can also be used to make a determination as to the degree of saliency of specific portions of the predictor, and in turn, a degree by which to suppress those component computations.

The analysis of the predictor can involve determining a salience of portions of the predictor. The determination can be made with reference to binary, multi-level, or continuous degrees of salience. The degree of salience can be based on a binary classification of the values in the predictor. For example, 0/1 values in the predictor can be alternatively classified as non-salient/salient. Such binary determinations can also be made with respect to multilevel values in the predictor through the use of a threshold (e.g., values exceeding threshold X are classified as salient and values less than threshold X are classified as non-salient). The degree of salience can be based on a multilevel degree of salience (e.g., values below threshold X are classified as not salient, values above threshold Y are classified as less salient, and values above threshold Y are classified as salient, etc.). All these determinations can be conducted with reference to specific values of the predictor or to collections of values. For example, the determination can be made by analyzing an average of a collection of values of a portion of the predictor. All these determinations can be conducted with respect to an absolute value of the values of the predictor or the actual value.

The suppressing step of component computations can be conducted based on the salience in various ways. In the case of a binary determination as to the salience of specific portions of the predictor, associated computations can be suppressed in two different ways. For example, computations associated with salient portions of the predictor could be fully calculated while computations associated with non-salient portions are not calculated at all or at a reduced resolution (e.g., using lower precision operands for the values involved in the computation or rounding the output of the computations). In the case of a multilevel or continuous determination as to the salience of specific portions of the predictor, associated computations can be suppressed in various ways. For example, in the case of three levels of salience, one set of associated computations could be fully calculated, one set of associated computations could be calculated with lower resolution, and one set of associated computations could not be calculated at all. As another example, in the case of multilevel or continuous degrees of salience, multiple thresholds could be set to determine a degree by which the associated computations were suppressed (e.g., a salience level of 1 and 4 would both be fully suppressed while a salience level of 10 was fully calculated). As another example, in the case of multilevel or continuous degrees of salience, each level of salience could be associated with an associated degree of suppression (e.g., saliency level 1 uses 1 bit representations or the operands, saliency level 2 uses 2 bit representations of the operands, up to a level of salience associated with the number of bits used to represent operands in a fully calculated computation, etc.)

Flowchart 100 can optionally include additional steps. In specific embodiment of the invention, flowchart 100 includes a step 105 of generating one or more additional summaries for one or more additional sets of data. For example, step 105 can include generating a second summary of a third set of data. The third set of data can be an input for a third composite computation of the complex computation. With reference back to FIG. 2, the third set of data can be set of data 231 in composite computation 230. Flowchart 100 can also include a step 106 of executing one or more additional simplified composite computations using the one or more summaries generated in step 105, to produce one or more additional simplified outputs. For example, step 106 can include executing a third simplified composite computation, using the second summary generated in step 105, to produce a third simplified output. The third simplified composite computation can be a simplification of the third composite computation. In those embodiments, other composite computations in the complex computation can use one or more of the simplified outputs generated in step 102 and 106. For example, the executing of the second simplified composite computation in step 103 can use an additional simplified output such as the third simplified output generated in step 106. The composite computations (e.g., the first composite computation, the third composite computation, and the second composite computations) can all be part of the complex computation for a directed graph where some computations depend on others, so that the output of a previous computation can be used as input in subsequent computations. For example, the second composite computation can depend on the third composite computation in the directed graph. Referring back to the example in FIG. 3, this could include generating a summary of the third set of data 231 in composite computation 230, to obtain a simplified output which would be a simplification of the third output 233 and use both the first simplified output 313 and the simplification of output 233 to execute composite computation 320. In this example, the predictor 350 could be generated by using two summarized data sets.

Figure 6:
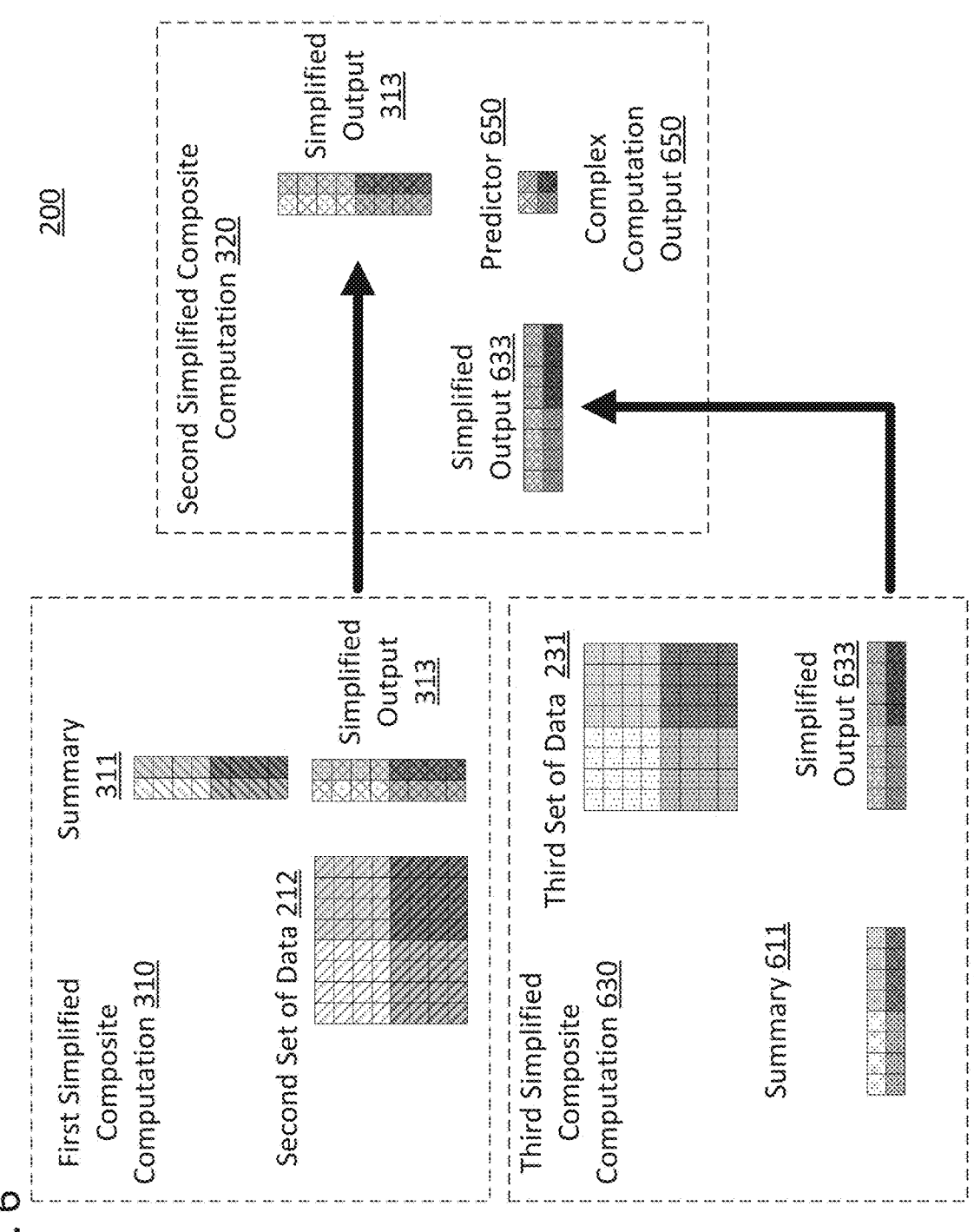
FIG. 6 illustrates an example of an embodiment in which additional sets of data are summarized, in accordance with specific embodiments of the invention disclosed herein.

FIG. 6 illustrates an example of an embodiment in which additional sets of data are summarized in accordance with step 105 and additional composite computations are simplified in accordance with step 106. As illustrated, in addition to summary 311 (generated by executing step 101), a summary 611 of the set of data 232 can also be generated by executing step 105. This summary can be used to execute a simplified composite computation 630 alternatively or in addition to the simplified composite computation 310, in accordance with step 106. The simplified composite computation 630 can produce a simplified output 633 as explained with reference to output 313 of simplified composite computation 310. As illustrated, both simplified outputs can be used as inputs in a subsequent simplified composite computation such as simplified composite computation 320. The execution of this subsequent computation can be in accordance with step 103 of flowchart 100. As illustrated, a predictor 650 is generated from the execution of the composite computation. The dimensions of the predictor in this example are further reduced as the summaries are themselves reductions of the original sets of data and were generated so that their dimensions still matched for calculations. In specific embodiments of the invention, the first summary 311 can be less than or equal to one quarter of a size of the first set of data, and the third summary 611 can be less than or equal to one quarter of a size of the third set of data.

The summaries 311 and 611 were generated so that the resulting outputs 313 and 633 were compatible for the calculation in composite computation 320 (a matrix multiplication in this example). However, the form and dimensions of the summaries and resulting outputs could vary so long as they are compatible for further calculations. For example, summary 311 and summary 611 have been generated with opposite dimensions (one being an 8×2 data structure while the other is a 2×8 data structure). The outputs 313 and 633 produced by the respective calculations are therefore compatible for composite computation 320 (a matrix multiplication). However, if composite computation 320 included a transpose of one of the inputs, the summaries could have been generated with equal dimensions and will still be compatible for execution of composite computation 320 (a transpose of one input plus a matrix multiplication). This example illustrated how the generation of the summaries can vary depending on the use of such summaries and respective outputs throughout the execution of the complex computation. The means for generating the summary of the sets of data can be able to analyze the complex computation (for example the connections in the directed graph and corresponding distribution of data for the computations) so that the summaries are generated accordingly.

In specific embodiments of the invention, a subsequent composite computation (e.g., the second composite computation of step 103) can depend on a previous composite computation (e.g., the first composite computation of step 102 and/or the third composite computation of step 106) because one or more outputs of the previous computations can be used as inputs to the subsequent composite computation (e.g., a first output of the first composite computation in step 102 and a third output of the third composite computation in step 106 can both be inputs to the second composite computation in step 103). In the examples mentioned in this disclosure of the composite computations being matrix multiplications (i.e., the first composite computation is a first matrix multiplication, the third composite computation is a third matrix multiplication, the second composite computation is a second matrix multiplication, etc.) the outputted matrices of the previous matrix multiplications can be used as an inputs to the subsequent matrix multiplication. In this way, generating a summary of one or more sets of data and producing a simplified output by using such summary can impact the subsequent computations by producing simplified outputs by the subsequent composite computations that depended from the output simplified in the first place.

In specific embodiments of the invention, the predictor can be the final output of the complex computation as obtained from the simplification of one or more composite computations (i.e., by generating summaries of one or more sets of data and/or executing simplified composite computations to obtain simplified outputs). In specific embodiments of the invention, any simplified output obtained from the execution of simplified composite computations throughout the graph can be a predictor. In this way, suppressing computations based on the predictor (e.g., by executing step 104) can be achieved by directly suppressing such computations once a predictor is produced, or by passing the predictor/simplified output forward (e.g., as indicated by the dependencies of the directed graph) to produce one or more predictors, until a final predictor is produced and used to suppress the computations in step 104.

In specific embodiments of the invention, computations can be suppressed from any composite computation in the complex computation based on the predictor. Examples of this feature were given with reference to FIG. 4 and FIG. 5, where it was shown that more composite computations in the chain of composite computations can be simplified based on the predictor. Specific embodiments of the invention suppress component computations in a final composite computation (e.g., the second composite computation 220) from whose simplified version the predictor has been generated. However, this is not a limitation of the present invention as any composite computation could have its associated computations suppressed so long as they are not significant for calculating the data elements in the portions indicated as salient by the predictor. In this way, step 104 can include suppressing, while executing the complex computation, a set of component computations from any composite computation (e.g., the first composite computation 210 and/or the third composite computation 230), as illustrated in the previous examples. The set of component computations to be suppressed from any of the composite computations (e.g., from the first 210/third 230 composite computation) can be selected for suppression based on the predictor, which can be a final predictor obtained from executing the complete graph, or an intermediary predictor obtained for example from the simplified execution of the respective composite computation and/or a subsequent composite computation (e.g., second composite commutation 220).

Step 106 in flowchart 100 can include executing any number of additional simplified composite computations, using any number of simplified outputs that have been generated for any set of data involved in the computation. Each execution of a simplified composite computation can produce a predictor, either the final predictor of the complex computation or a predictor or an intermediary predictor. The predictors generated from such simplified execution (e.g., in step 106) can be used to suppress component computations from the composite computation which was simplified to generate the predictor, or to suppress computations from any other composite computation, such as a composite computation which depends from the composite computation simplified to generate the predictor. For example, step 106 can include executing a fourth simplified composite computation, using a second simplified output (e.g., from step 105), to produce a fourth simplified output. The fourth simplified output can be a predictor (e.g., third predictor). The fourth simplified composite computation in step 106 can be a simplification of a fourth composite computation which is part of the complex computation for the directed graph and depend on the second composite computation in the directed graph. In this case, step 104 can include suppressing, while conditionally executing the complex computation, a set of component computations from the fourth composite computation, wherein the set of component computations from the fourth composite computation can be selected for suppression based on the third predictor. In specific embodiments of the invention, step 104 can include suppressing, while executing the complex computation, an entire composite computation. The composite computation can be selected for suppression based on one or more predictors generated by executing simplified composite computations. For example, step 104 can include suppressing, while executing the complex computation, the first composite computation (simplified in step 102), which can be selected for suppression based on a first predictor (e.g., generated in step 103) and/or one or more additional predictors (e.g., the third predictor generated in step 106). While not illustrated by the examples provided herein, the suppression of entire composite computations could be effectuated in examples with a larger number of composite computations feeding into a single predictor.

In specific embodiments of the invention, the composite computations can be computations involving directed graph data and execution data. For example, the first composite computation can be a first matrix multiplication which can be a multiplication of a first set of directed graph data and a first set of execution data to produce a first output matrix, the third composite computation can be a third matrix multiplication which can be a multiplication of a third set of directed graph data and a third set of execution data to produce a third output matrix, and the second composite computation can be a second matrix multiplication which can be a multiplication of the first output matrix and the third output matrix.

Figure 7:
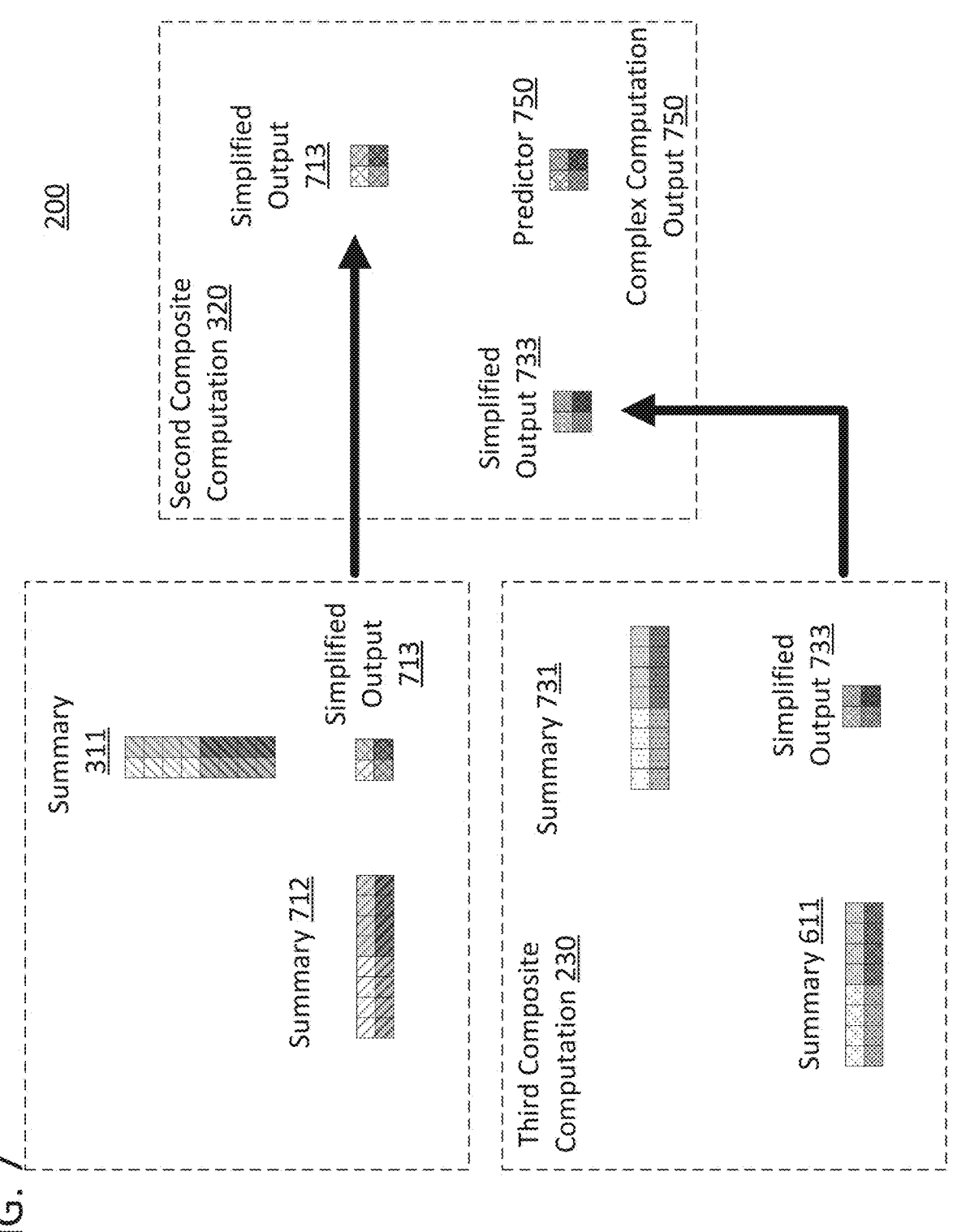
FIG. 7 illustrates an example in which multiple inputs to a composite computation are summarized, in accordance with specific embodiments of the invention disclosed herein.

In specific embodiments of the invention, step 105 in flowchart 100 of generating one or more additional summaries of one or more additional sets of data can include generating summaries for various sets of data to be used by the same composite computation. FIG. 7 illustrates an example in which summaries are generated for additional sets of data. In this example, step 105 can include generating a second summary 712 of the second set of data 212, where the second set of data is an additional input for the composite computation 210. The set of data can also be an additional input such as a third input for the first composite computation 210. In this example, executing the first simplified composite computation in step 102 can use the second summary 712 in combination with or in the alternative of the first summary 311 (generated in step 101).

In specific embodiments of the invention, flowchart 100 can include one or more steps, such as step 107, of generating additional summaries of additional sets of data, where the additional sets of data are inputs for composite computations in the complex computation. For example, with reference to FIG. 7, step 107 can include generating a fourth summary 731 of the fourth set of data 231. The additional (e.g., fourth) set of data can be an additional input (e.g., a third input) for the third composite computation 230. In this example, executing the third simplified composite computation (e.g., in step 106) can use the fourth summary generated in step 107, in combination with or in the alternative of the summaries generated in other steps.

As explained with reference to FIG. 7, multiple, or even all, inputs to a composite computation can be summarized for the simplified execution of the composite computation. Additionally, and as also explained with reference to FIG. 7, multiple, or even all, composite computations in a given instance of the directed graph can have their inputs summarized for simplified execution of multiple composite computations. A subsequent composite computation which receives the outputs of such simplified composite computations (e.g., simplified composite computation 320 in the example of FIG. 7 can receive the simplified output 713 and the simplified output 733 as inputs) can also be executed in a simplified execution because the inputs are already simplified. As illustrated, the output/predictor 750 is a data structure of the same dimensions as that obtained in the example of FIG. 6 (where only one of the input data sets for each previous composite computation was summarized). However, the overall number of operations conducted to obtain the predictor can be significantly reduced in the example of FIG. 7 because more sets of data were summarized in previous computations, which leads to smaller data structures to be operated upon along the execution of the directed graph. On the other hand, the prediction can be less precise as more data is summarized. Specific embodiments of the invention take into account the compromise between the data that is summarized for computations and a desired precision or error margin for the prediction to generate the summaries of the sets of data. In this way, flowchart 100 can include an additional step of determining a precision degree (which can be received from external sources such as in the form of instructions for the execution of an instance of the method or be based on threshold values stored in memory). The method can also include performing a decision on whether to perform steps 101, 105, 107 or any other additional steps for generating summaries, based on the desired precision degree.

In specific embodiments of the invention, the generating of the summaries (e.g., in steps 101, 105 and 107) can include performing an operation on the respective data sets for which the summary is being generated. In specific embodiments of the invention, the operation includes an average pooling operation on the respective data set for which the summary is being generated. For example, the generating of the first summary of the first set of data in step 101 can use an average pooling operation on the first set of data, and the generating of the third summary of the third set of data in step 105 can use the average pooling operation on the third set of data.

In specific embodiments of the invention, the operation (e.g., the average pooling operation) used to generate the summary can be the same operation for all the summaries being generated, different operations, or the same operation performed in different ways. For example, generating one or more of the summaries for a given composite computation can use an average pooling operation while generating one or more other summaries can use another operation, such as another average pooling operation. For example, the generating of the first summary of the first set of data in step 101 can use an average pooling operation on the first set of data and the generating of the third summary of the third set of data in step 105 can use the same average pooling operation on the third set of data. On the other hand, the generating of the second summary of the second set of data in step 105 can use a third average pooling operation on the second set of data, and the generating of the fourth summary of the third set of data can use the same third average pooling operation on the fourth set of data. The third operation can be the same or different than the first.

Specific embodiments of the invention disclosed herein are described with reference to a set of processing cores in a multicore processor executing an ANN or other complex computation. The processing cores of a multicore processor can cooperatively execute complex computations by executing composite computations of those complex computations in distributed fashion across the processing cores. To do so, the processing cores need to share data required for the execution of those composite computations as well as receive instructions regarding which composite computations they have been assigned. The processing cores can share this information using an interconnect fabric such as a network-on-Chip (NoC). The same network can be used to load the individual processing cores with their instructions and to provide them with the initial data to execute the computation. A multicore processor, including the various processing cores and the interconnect fabric which connects them, may provide a basis for explaining various embodiments of the invention disclosed herein. However, while the example of a set of cores of a multicore processor is used as an example throughout this disclosure, specific embodiments of the invention disclosed herein are more broadly applicable to any set of computational nodes connected using any form of interconnect fabric or network.

Figure 8:
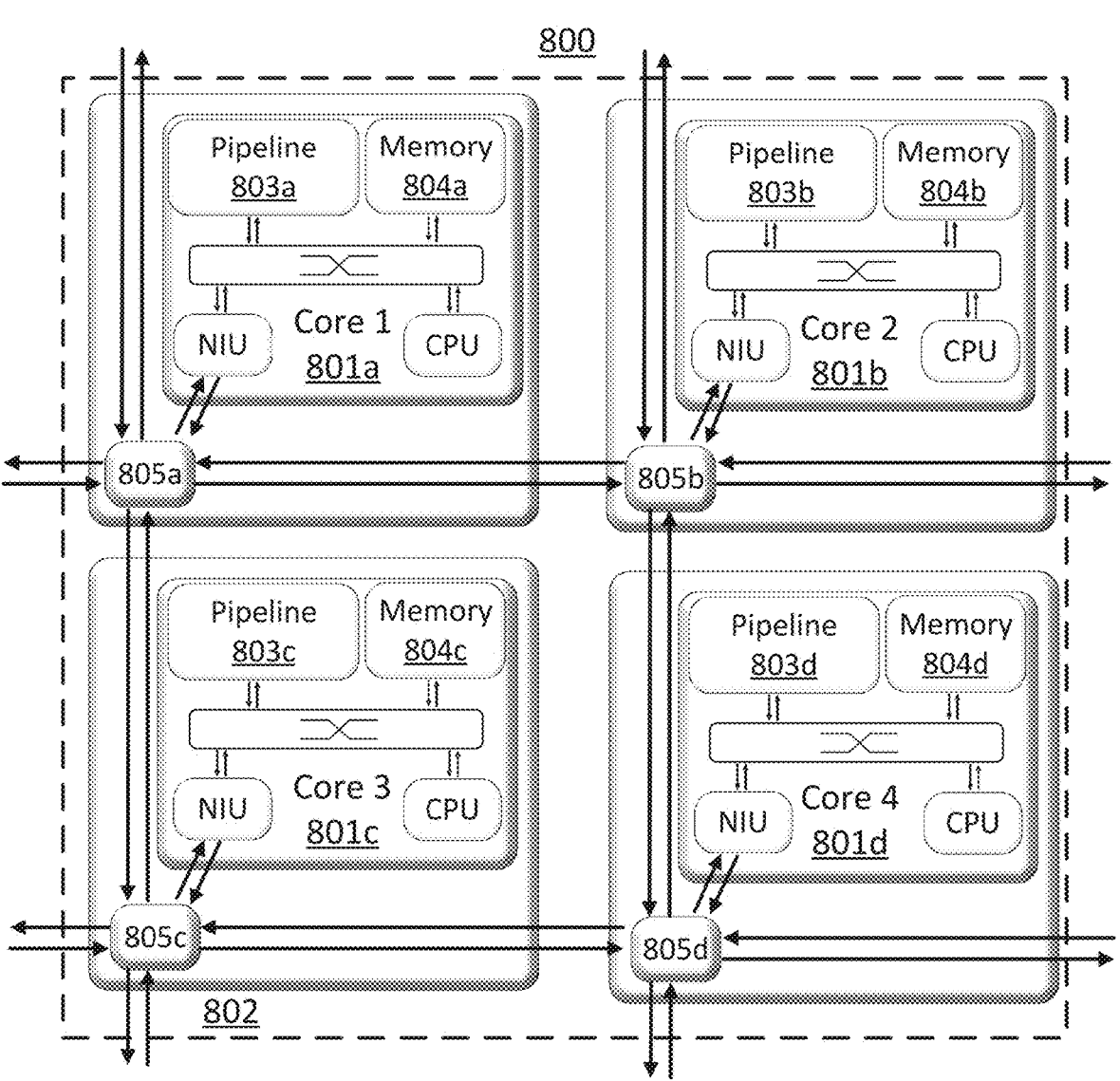
FIG. 8 illustrates a block diagram of a system in accordance with specific embodiments of the invention disclosed herein.

FIG. 8 illustrates a block diagram of a system 800 in accordance with specific embodiments of the invention disclosed herein. The system includes a set of processing cores 801a, 801b, 801c, and 801d, and a network 802 communicatively connecting the processing cores. The illustrated network 802 is an interconnect fabric in the form of a network-on-chip ("NoC") and associated circuitry such as routers and network interface units on each of the processing cores. The system also includes a set of processing pipelines 803a, 803b, 803c, and 803d, on the set of processing cores, and a set of instructions stored on a set of memories 804a,

804*b*, 804*c*, and 804*d* across the set of processing cores. The set of instructions stored on the set of memories across the set of processing cores, are instructions which, when executed by the set of processing pipelines 803*a*, 803*b*, 803*c*, 803*d*, cause the system to execute an ANN and conduct a method in accordance with the methods described with reference to FIG. 1. In this way, a system such as system 800 comprises means for performing all the steps described before in this disclosure with reference to flowchart 100.

In specific embodiments of the invention, a system such as system 800 comprises a means for generating one or more summaries of one or more sets of data (e.g., by performing steps 101, 105, 107). The means for generating summaries can be one or more of the processing cores in system 800, such as one of cores 801*a*, 801*b*, 801*c* and 801*d*. The means for generating summaries can be a software module instantiated in one or more of the processing cores in system 800, such as one of cores 801*a*, 801*b*, 801*c* and 801*d*. For example, the means for generating summaries can include the CPUs of the respective cores controlling an operation conducted by the respective pipeline (803*a*, 803*b*, 803*c*, 803*d*) on the set of data being summarized, such operation being executed by executing instructions stored in memory, such as respective memories 804*a*, 804*b*, 804*c* and 804*d*. Generating summaries of sets of data can include receiving the set of data at the respective core, for example via one or more of the routers 805*a*, 805*b*, 805*c* and 805*d*, optionally storing such set of data in memory (e.g., memories 804*a*, 804*b*, 804*c*, 804*d*), and performing an operation to summarize the set of data, for example in the respective processing pipeline (e.g., pipelines 803*a*, 803*b*, 803*c*, 803*d*). As explained before in this disclosure, the operation performed in the set of data can include an average pooling operation or other operation that summarizes portions of the set of data. The operation can also include a determination of a degree of precision to determine if and how to summarize the data. The generated summary can then be stored in memory for further processing and/or be transmitted out of the core and into another core via the corresponding routers (e.g., routers 805*a*, 805*b*, 805*c*, 805*d*), assisted by the respective NIUs.

In specific embodiments of the invention, a system such as system 800 comprises a means for executing one or more computations, which can be composite computations and/or simplified composite computations (e.g., first simplified composite computation 310). The simplified computations can be executed using the summaries generated by the means for generating summaries and can produce simplified outputs, as described before in this disclosure. The means for executing computations can be one or more of the processing cores in system 800, such as one of cores 801*a*, 801*b*, 801*c* and 801*d*. The means for executing the computations can be the processing pipelines in the cores (e.g., pipelines 803*a*, 803*b*, 803*c*, 803*d*). The means for means for executing computations can be one or more core controllers operating in concert with the processing pipelines on one or more of the cores. For example, the means for executing computations can include the CPUs of the respective cores controlling an operation conducted by the respective pipeline (803*a*, 803*b*, 803*c*, 803*d*) on the sets of data involved in the computation (e.g., summary 311). Executing the computations can include receiving the sets of data/summaries at the respective cores, for example via one or more of the routers 805*a*, 805*b*, 805*c* and 805*d*, or accessing such data from memory if available. Executing the computations can optionally also include storing the data to be computed in memory (e.g., memories 804*a*, 804*b*, 804*c*, 804*d*), and performing an operation to execute the computation (e.g., a portion of a matrix multiplication), for example in the respective processing pipeline (e.g., pipelines 803*a*, 803*b*, 803*c*, 803*d*). The output of the computation can then be stored in memory for further processing and/or be transmitted out of the core and into another core via the corresponding routers (e.g., routers 805*a*, 805*b*, 805*c*, 805*d*), assisted by the respective NIUs.

In specific embodiments of the invention, a system such as system 800 comprises additional means for executing additional computations, such as second simplified composite computation 220. The means for executing additional computations can be the same as or similar to the means for executing computations. For example, in system 800, various cores can be involved in the execution of a computations such as computation 200 in FIG. 2 or computation 300 in FIG. 3. Each of those cores, or their combination, constitute means for executing computations as used in this disclosure.

In specific embodiments of the invention, a system such as system 800 comprises a means for suppressing a set of component computations from one or more composite computations, while executing a complex computation. The means for suppressing can be one or more of the processing cores in system 800, such as one of cores 801*a*, 801*b*, 801*c* and 801*d*. The means for suppressing can be a software module instantiated in one or more of the processing cores in system 800, such as one of cores 801*a*, 801*b*, 801*c* and 801*d*. For example, the means for suppressing can include the CPUs of the respective cores controlling an operation conducted by the respective pipeline (803*a*, 803*b*, 803*c*, 803*d*) on a computation being executed, such operation being executed by executing instructions stored in memory, such as respective memories 804*a*, 804*b*, 804*c* and 804*d*. The means for suppressing can also include specialized logic and registers incorporated into the processing pipelines to suppress computations based on control data that is provided orthogonally to the main computational flow of the processing pipeline. Suppressing computations can include analyzing a predictor to determine degree of saliency of various portions of such predictor. In this way, a system such as system 800 can also include a means for analyzing the predictor to find a set of salient portions. The means for analyzing the predictor can be one or more of the set of processing cores or a higher level controller responsible for the overall distribution of the complex computation. The analyzing and the suppressing can take place at a core level, for example by each core being programmed to determine if the portions indicated as not salient are to be generated by computations assigned to the respective core, and not executing the computation if so. The suppressing can also take place at a higher hierarchical level, such as by a higher-level controller and/or a compiler responsible for distributing computations among the processing cores and selecting computations that generate salient values for transmission to the respective processing cores, while other computations that generate not salient values are not selected for transmission to any processing core.

Systems in accordance with this disclosure can include various components in the alternative or in combination. For example, the processing pipelines can be replaced by any execution area in a computation system. The system also includes local controllers on each of the cores in the form of a set of CPUs. The system can also comprise a neural network which can be stored on the set of memories 804*a*, 804*b*, 804*c*, and 804*d* across the set of processing cores. In specific embodiments, such as the embodiments in accordance with FIG. 8, the set of memories that store the neural network can be the same memories which store the instructions mentioned previously. However, in alternative embodiments, there could be different memories for the instructions and the network data for the neural network on each of the processing cores.

In specific embodiments of the invention, the network of processing cores used to execute a complex computation can include a connection to an external memory. The memory can be a random-access memory. The memory can be used to load the network data into the network of processing cores. The memory can be on the same substrate as one or more of the processing cores or be physically separate.

The processing cores disclosed herein can take on various forms. The processing cores can be processing cores in a multicore processor or standalone processors. The processing cores can be implemented as single chip systems, including wafer-scale single chip systems, multichip single package systems, or in a multichip multipackage system in which the chips are commonly attached to a common substrate such as a printed circuit board (PCB), interposer, or silicon mesh.

Although the specific examples provided in this section are directed to a network of computational nodes in the form of a NoC connecting a set of processing cores in a multicore processor, the approaches disclosed herein are broadly applicable to networks of any form of computational nodes. Furthermore, networks in accordance with this disclosure can be implemented on a single chip system, including wafer-scale single chip systems, in a multichip single package system, or in a multichip multipackage system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. Networks in accordance with this disclosure can also be implemented in chiplet based systems. For example, in specific embodiments of the invention, one or more computational nodes could be housed or implemented by one or more chiplets, connected, for example, through an interposer.

The processing cores in accordance with this disclosure can include at least one non-transitory computer readable media. The media could include cache memories on the processing cores. The media can also include shared memories that are not associated with a unique computational node. The media could be a shared memory, could be a shared random-access memory, and could be, for example, a DRAM. The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

Throughout this disclosure, ANNs provided a basis for explaining various embodiments of the invention disclosed herein. However, specific embodiments of the invention disclosed herein are more broadly applicable to the execution of any directed graph. Furthermore, specific embodiments of the invention disclosed herein are more broadly applicable to any complex computation including those used in association with graphics renderings, cryptographic algorithms, and big data computations generally.

In specific embodiments of the invention, a directed graph executed using the approaches disclosed herein can be an attention network. Attention networks utilize key, query, and value matrices to generate an inference. Executing these directed graphs and deriving an inference from the networks can involve the use of extremely large data structures with composite computations that depend on prior composite computations such that the approaches disclosed herein can be beneficially deployed to drastically reduce the computational resources required to do so.

In specific implementations, two key matrices and two query matrices are first multiplied together and the product of those composite computations are then multiplied together in a second step. The product of the key matrices multiplication or the product of the query matrices can be transposed prior to conducting the second step. Referring back to FIG. 2, the key matrices multiplication can be first composite computation 210, the query matrices multiplication can be the third composite computation 230 and the second step can be the second composite computation 220. Accordingly, first set of data 211 can be one of a right key matrix and a left key matrix, with the second set of data 212 serving as the alternative key matrix. On the other hand, the third set of data 231 can be one of a right query matrix and a left query matrix, with the fourth set of data 232 serving as the alternative query matrix. In this way, the first composite computation can be a key matrix multiplication, and the third composite computation can be a query matrix multiplication. A potential modification for these implementations is that the first output 213 or third output 233 may be transposed before being used as an input in second composite computation 220. Any of the approaches disclosed herein can then be applied to first generate a predictor and then suppress computations in the complex computations that comprises these three composite computations and that forms a part of the directed graph in the form of an attention network.

In specific implementations of an attention network, that can be conducted in combination with or in alternative to those described in the prior paragraph, a query matrix and a key matrix are multiplied in a first composite computation and the product of that composite computation is transformed before being multiplied with a values matrix. Referring back to FIG. 2, only the first and second composite computations would be involved, where the first set of data 211 can be one of a key matrix and a query matrix, and the second simplified composite computation can use a simplified values matrix. Any of the approaches disclosed herein can then be applied to first generate a predictor and then suppress computations in the complex computations that comprises these two composite computations and that forms a part of the directed graph in the form of an attention network.

Figure 9:
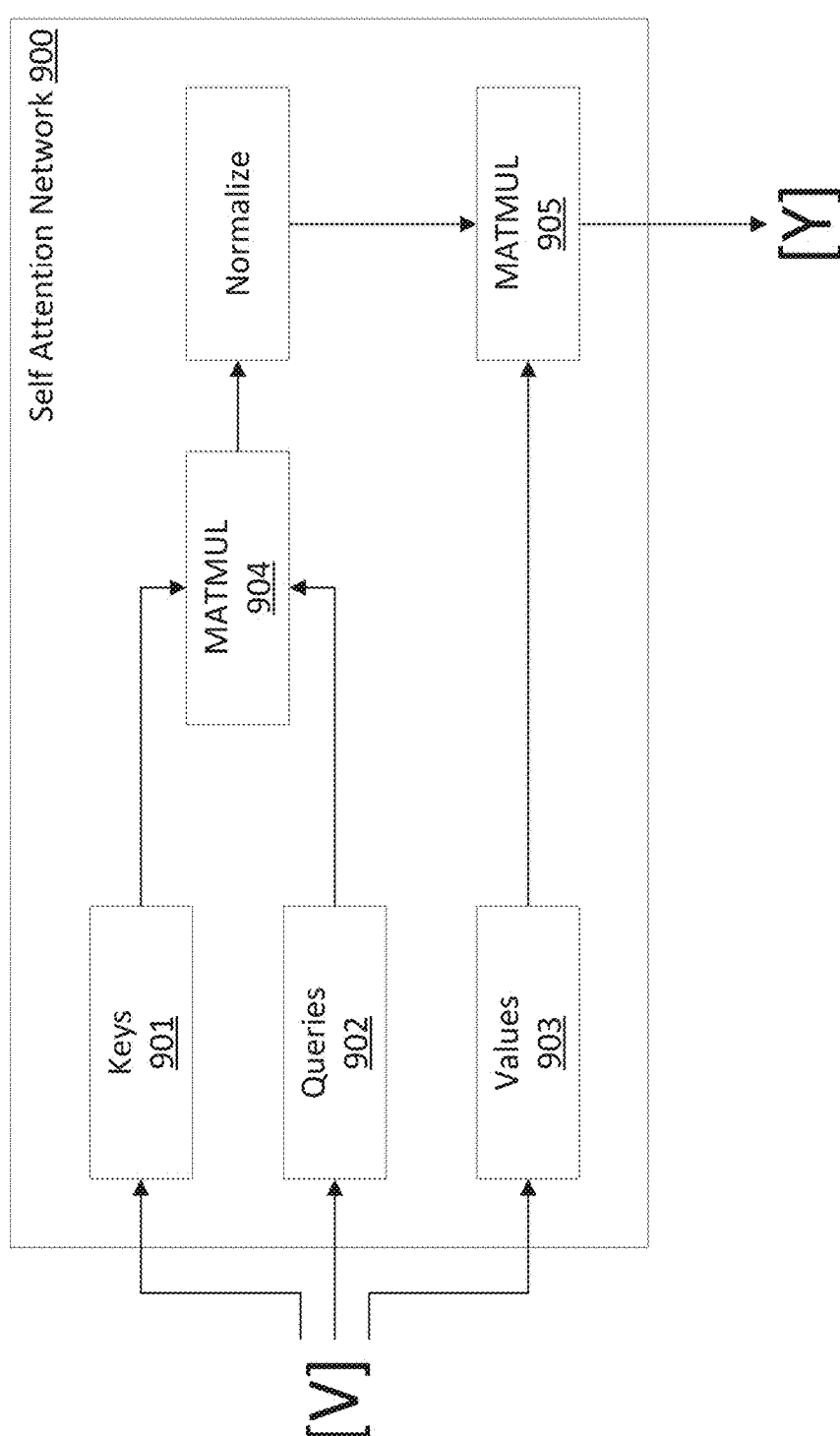
FIG. 9 illustrates an example of a directed graph to which specific embodiments of the invention can be applied in the form of a self-attention network, in accordance with specific embodiments of the invention disclosed herein.

FIG. 9 illustrates an example of a directed graph to which specific embodiments of the invention can be applied in the form of a self-attention network, in accordance with specific embodiments of the invention disclosed herein. In the illustrated self-attention network 900, the values [V] are inputs to the directed graph. The keys 901 and queries 902 can be linear vectors. A first composite computation such as computation 210 in FIG. 2 can be in the form of the first matrix multiplication (MATMUL) function 904 of Keys 901 and Queries 902. A second composite computation such as computation 220 in FIG. 2 can be in the form of the second MATMUL function 905 of the normalized product of the first MATMUL function 904 and the values 903, which can also be in the form of a linear vector in this example.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A computer-implemented method, conducted during an execution of a neural network, comprising:

generating a first summary of a first set of data, wherein the first set of data is an input for a first composite computation;

executing a first simplified composite computation, using the first summary, to produce a first simplified output, wherein the first simplified composite computation is a simplification of the first composite computation;

executing a second simplified composite computation, using the first simplified output, to produce a second simplified output, wherein the second simplified output is a predictor, wherein the second simplified composite computation is a simplification of a second composite computation; wherein the first composite computation and the second composite computation are both part of a complex computation for the neural network; and wherein the second composite computation depends on the first composite computation in the neural network; and suppressing, while executing the complex computation, a set of component computations from the second composite computation, wherein the set of component computations from the second composite computation are selected for suppression based on the predictor;

wherein the execution of the neural network uses a processing pipeline; and wherein the suppressing of the set of component computations uses logic and registers incorporated into the processing pipeline that suppress the set of component computations using control data provided orthogonally to a main computational flow of the processing pipeline.

2. The computer-implemented method of claim 1, further comprising:

generating, a third summary of a third set of data, wherein the third set of data is an input for a third composite computation; and executing a third simplified composite computation, using the third summary, to produce a third simplified output, wherein the third simplified composite computation is a simplification of the third composite computation;

wherein executing the second simplified composite computation uses the third simplified output;

wherein the first composite computation, the third composite computation, and the second composite computation are all part of the complex computation for the neural network; and wherein the second composite computation depends on the third composite computation in the neural network.

3. The computer-implemented method of claim 2, wherein:

the first composite computation is a first matrix multiplication;

the third composite computation is a third matrix multiplication;

the second composite computation is a second matrix multiplication; and the second composite computation depends on the first composite computation and the third composite computation because a first output of the first composite computation and a third output of the third composite computation are both inputs to the second composite computation.

4. The computer-implemented method of claim 3, wherein:

the first matrix multiplication is a multiplication of a first set of neural network data and a first set of execution data to produce a first output matrix;

the third matrix multiplication is a multiplication of a third set of neural network data and a third set of execution data to produce a third output matrix; and the second matrix multiplication is a multiplication of the first output matrix and the third output matrix.

5. The computer-implemented method of claim 2, wherein:

the generating of the first summary of the first set of data uses an average pooling operation on the first set of data; and the generating of the third summary of the third set of data uses the average pooling operation on the third set of data.

6. The computer-implemented method of claim 2, wherein:

the first summary is less than or equal to one quarter of a size of the first set of data; and the third summary is less than or equal to one quarter of a size of the third set of data.

7. The computer-implemented method of claim 2, wherein:

the neural network is an attention network;

the first set of data is one of a right key matrix and a left key matrix;

the third set of data is one of a right query matrix and a left query matrix;

the first composite computation is a key matrix multiplication; and the third composite computation is a query matrix multiplication.

8. The computer-implemented method of claim 2, further comprising:

generating a second summary of a second set of data, wherein the second set of data is a third input for the first composite computation, and wherein executing the first simplified composite computation uses the second summary; and generating a fourth summary of a fourth set of data, wherein the fourth set of data is a third input for the third composite computation, and wherein executing the third simplified composite computation uses the fourth summary.

9. The computer-implemented method of claim 8, wherein:

the generating of the first summary of the first set of data uses an average pooling operation on the first set of data;

the generating of the third summary of the third set of data uses the average pooling operation on the third set of data;

the generating of the second summary of the second set of data uses a second average pooling operation on the second set of data; and the generating of the fourth summary of the third set of data uses the second average pooling operation on the fourth set of data.

10. The computer-implemented method of claim 2, further comprising:

executing a fourth simplified composite computation, using the second simplified output, to produce a fourth simplified output, wherein the fourth simplified output is a third predictor, wherein the fourth simplified composite computation is a simplification of a fourth composite computation, wherein the fourth composite computation is part of the complex computation for the neural network, and wherein the fourth composite computation depends on the second composite computation in the neural network; and suppressing, while conditionally executing the complex computation, a set of component computations from the fourth composite computation, wherein the set of component computations from the fourth composite computation are selected for suppression based on the third predictor.

11. The computer-implemented method of claim 10, further comprising:

suppressing, while executing the complex computation, the first composite computation, wherein the first composite computation is selected for suppression based on the predictor and the third predictor.

12. The computer-implemented method of claim 1, further comprising:

suppressing, while executing the complex computation, a set of component computations from the first composite computation, wherein the set of component computations from the first composite computation are selected for suppression based on the predictor.

13. The computer-implemented method of claim 1, wherein:

suppressing, while executing the complex computation, the first composite computation, wherein the first composite computation is selected for suppression based on the predictor.

14. The computer-implemented method of claim 1, further comprising:

analyzing the predictor to find a set of salient portions; wherein the set of component computations from the second composite computation are selected based on a distribution of the set of salient portions.

15. The computer-implemented method of claim 14, wherein:

the analyzing of the predictor uses a top-k operation on a set of portions of the predictor to find the set of salient portions.

16. The computer-implemented method of claim 15, wherein:

the first composite computation is a first matrix multiplication;

the set of salient portions are in one half of the predictor; and the computer-implemented method further comprises suppressing, while conditionally executing the complex computation, at least half of the component computations from the first composite computation, wherein the set of component computations from the first composite computation are selected for suppression based on the predictor.

17. The computer-implemented method of claim 1, wherein:

the neural network is an attention network;

the first set of data is one of a key matrix and a query matrix; and the second simplified composite computation uses a simplified values matrix.

18. A processing core comprising:

a processor;

a processing pipeline;

logic and registers incorporated into the processing pipeline; and one or more computer readable media storing instructions which, when executed by the processor, cause the processing core to:

generate a first summary of a first set of data, wherein the first set of data is an input for a first composite computation;

execute a first simplified composite computation, using the first summary, to produce a first simplified output, wherein the first simplified composite computation is a simplification of the first composite computation;

execute a second simplified composite computation, using the first simplified output, to produce a second simplified output, wherein the second simplified output is a predictor, wherein the second simplified composite computation is a simplification of a second composite computation; wherein the first composite computation and the second composite computation are both part of a complex computation for a neural network; and wherein the second composite computation depends on the first composite computation in the neural network; and suppress, while executing the complex computation, a set of component computations from the second composite computation, wherein the set of component computations from the second composite computation are selected for suppression based on the predictor;

wherein: (i) the execution of the neural network uses the processing pipeline; and (ii) the suppressing of the set of component computations uses the logic and registers incorporated into the processing pipeline to suppress the set of component computations using control data provided orthogonally to a main computational flow of the processing pipeline.

19. A system comprising:

a means for generating a first summary of a first set of data, wherein the first set of data is an input for a first composite computation;

a means for executing a first simplified composite computation using the first summary to produce a first simplified output, wherein the first simplified composite computation is a simplification of the first composite computation;

a means for executing a second simplified composite computation, using the first simplified output, to produce a second simplified output, wherein the second simplified output is a predictor, wherein the second simplified composite computation is a simplification of a second composite computation; wherein the first composite computation and the second composite computation are all part of a complex computation for a neural network; and wherein the second composite computation depends on the first composite computation in the neural network; and a means for suppressing, while executing the complex computation, a set of component computations from the second composite computation, wherein the set of component computations from the second composite computation are selected for suppression based on the predictor.

20. The system of claim 19, further comprising:
a means for generating a third summary of a third set of data, wherein the third set of data is an input for a third composite computation;
a means for executing a third simplified composite computation using the third summary to produce a third simplified output, wherein the third simplified composite computation is a simplification of the third composite computation;
wherein executing the second simplified composite computation uses the third simplified output;
wherein the first composite computation, the third composite computation, and the second composite computation are all part of the complex computation for the neural network; and
wherein the second composite computation depends on the third composite computation in the neural network.

21. The system of claim 20, wherein:
the first composite computation is a first matrix multiplication;
the third composite computation is a third matrix multiplication;
the second composite computation is a second matrix multiplication; and
the second composite computation depends on the first composite computation and the third composite computation because a first output of the first composite computation and a third output of the third composite computation are both inputs to the second composite computation.

22. The system of claim 21, wherein:
the first matrix multiplication is a multiplication of a first set of neural network data and a first set of execution data to produce a first output matrix;
the third matrix multiplication is a multiplication of a third set of neural network data and a third set of execution data to produce a third output matrix; and
the second matrix multiplication is a multiplication of the first output matrix and the third output matrix.

23. The system of claim 20, wherein:
generating the first summary of the first set of data uses an average pooling operation on the first set of data; and
generating the third summary of the third set of data uses the average pooling operation on the third set of data.

24. The system of claim 20, wherein:
the first summary is less than or equal to one quarter of a size of the first set of data; and
the third summary is less than or equal to one quarter of a size of the third set of data.

25. The system of claim 20, wherein:
the neural network is an attention network;
the first set of data is one of a right key matrix and a left key matrix;

the third set of data is one of a right query matrix and a left query matrix;
the first composite computation is a key matrix multiplication; and
the third composite computation is a query matrix multiplication.

26. The system of claim 20, further comprising:
a means for generating a second summary of a second set of data, wherein the second set of data is a third input for the first composite computation, and wherein executing the first simplified composite computation uses the second summary; and
a means for generating a fourth summary of a fourth set of data, wherein the fourth set of data is a third input for the third composite computation, and wherein executing the third simplified composite computation uses the fourth summary.

27. The system of claim 26, wherein:
the means for generating the first summary of the first set of data uses an average pooling operation on the first set of data;
the means for generating the third summary of the third set of data uses the average pooling operation on the third set of data;
the means for generating the second summary of the second set of data uses a third average pooling operation on the second set of data; and
the means for generating the fourth summary of the third set of data uses the third average pooling operation on the fourth set of data.

28. The system of claim 20, further comprising:
a means for executing a fourth simplified composite computation, using the second simplified output, to produce a fourth simplified output, wherein the fourth simplified output is a third predictor, wherein the fourth simplified composite computation is a simplification of a fourth composite computation, wherein the fourth composite computation is part of the complex computation for the neural network, and wherein the fourth composite computation depends on the second composite computation in the neural network; and
a means for suppressing, while conditionally executing the complex computation, a set of component computations from the fourth composite computation, wherein the set of component computations from the fourth composite computation are selected for suppression based on the third predictor.

29. The system of claim 28, further comprising:
a means for suppressing, while executing the complex computation, the first composite computation, wherein the first composite computation is selected for suppression based on the predictor and the third predictor.

30. The system of claim 19, further comprising:
a means for suppressing, while executing the complex computation, a set of component computations from the first composite computation, wherein the set of component computations from the first composite computation are selected for suppression based on the predictor.

31. The system of claim 19, further comprising:
a means for suppressing, while executing the complex computation, the first composite computation, wherein the first composite computation is selected for suppression based on the predictor.

32. The system of claim 20, further comprising:
a means for analyzing the predictor to find a set of salient portions;

wherein the set of component computations from the second composite computation are selected based on the set of salient portions.

33. The system of claim 32, wherein:

the first composite computation is a first matrix multiplication;

the set of salient portions are in one half of the predictor; and the system further comprises means for suppressing, while conditionally executing the complex computation, at least half of the component computations from the first composite computation, wherein the set of component computations from the first composite computation are selected for suppression based on the predictor.

34. The system of claim 19, wherein:

the neural network is an attention network;

the first set of data is one of a key matrix and a query matrix; and the second simplified composite computation uses a simplified values matrix.

35. The computer-implemented method of claim 1, wherein:

the execution of the neural network uses a set of processing cores; and the suppressing of the set of component computations is conducted by a hierarchical level responsible for distributing computations among the set of processing cores.

36. The processing core of claim 18, wherein:

the execution of the neural network uses a set of processing cores, including the processing core; and the suppressing of the set of component computations is conducted by a hierarchical level responsible for distributing computations among the set of processing cores.

37. The system of claim 19, wherein:

the execution of the neural network uses a processing pipeline; and the means for suppressing includes logic and registers incorporated into the processing pipeline that suppress the set of component computations using control data provided orthogonally to a main computational flow of the processing pipeline.

38. The system of claim 19, wherein:

the execution of the neural network uses a set of processing cores; and the means for suppressing includes a hierarchical level responsible for distributing computations among the processing cores.

\* \* \* \* \*